(12) United States Patent
Stiles et al.

(10) Patent No.: US 10,391,382 B2
(45) Date of Patent: Aug. 27, 2019

(54) HEAD AND NECK RESTRAINT DEVICE WITH DYNAMIC ARTICULATION

(71) Applicant: SCHROTH SAFETY PRODUCTS GMBH, Arnsberg (DE)

(72) Inventors: Mark Anthony Stiles, Atlanta, GA (US); Donald Thomas Myers, Warstein (DE)

(73) Assignee: SCHROTH SAFETY PRODUCTS GMBH, Arnsberg (DE)

( * ) Notice: Subject to any disclaimer, the term of this patent is extended or adjusted under 35 U.S.C. 154(b) by 0 days.

(21) Appl. No.: 14/562,295

(22) Filed: Dec. 5, 2014

(65) Prior Publication Data

US 2016/0158630 A1   Jun. 9, 2016

(51) Int. Cl.
| | | |
|---|---|---|
| A42B 3/04 | (2006.01) | |
| A63B 71/12 | (2006.01) | |
| B60R 21/00 | (2006.01) | |
| B60R 22/00 | (2006.01) | |
| A41D 13/015 | (2006.01) | |

(52) U.S. Cl.
CPC ........ *A63B 71/1291* (2013.01); *A41D 13/015* (2013.01); *A42B 3/0473* (2013.01); *B60R 22/001* (2013.01); *B60R 2021/0048* (2013.01); *B60R 2021/0086* (2013.01)

(58) Field of Classification Search
CPC . A63B 71/1291; A42B 3/0473; B60R 22/001; B60R 2021/0048; B60R 2021/0086; A41D 13/0512; A41D 13/0513; A41D 13/015
USPC ... 2/410, 411, 421, 422, 425, 455, 459, 460, 2/461, 468; 602/18, 5, 19
See application file for complete search history.

(56) References Cited

U.S. PATENT DOCUMENTS

| | | | |
|---|---|---|---|
| 3,497,872 A | | 3/1970 | Mitchell |
| 4,638,510 A | | 1/1987 | Hubbard |
| 4,654,893 A | | 4/1987 | Meyers et al. |
| 5,411,471 A | * | 5/1995 | Terrazas ................. A61F 5/055 2/421 |
| 5,517,699 A | | 5/1996 | Abraham, II |
| 5,768,717 A | | 6/1998 | Le Sueur |
| 6,009,566 A | | 1/2000 | Hubbard |
| 6,499,149 B2 | | 12/2002 | Ashline |
| 6,852,087 B1 | | 2/2005 | Dainese |
| 6,871,360 B1 | | 3/2005 | Ashline |

(Continued)

FOREIGN PATENT DOCUMENTS

| | | |
|---|---|---|
| EP | 2374364 A1 | 10/2011 |
| WO | 2008105010 A1 | 9/2008 |
| WO | 2009133524 A1 | 11/2009 |

OTHER PUBLICATIONS

Hubbard et al.; Biomechanical Performance of a New Head and Neck Support; 1990.

(Continued)

*Primary Examiner* — Anna K Kinsaul
*Assistant Examiner* — F Griffin Hall
(74) *Attorney, Agent, or Firm* — Barnes & Thornburg LLP; Jason Bernstein

(57) ABSTRACT

A head and neck restraint device for high performance race car drivers. The device includes a yoke, a collar and a pair of legs. The yoke and/or collar are adapted to pivotably articulate with respect to the legs. At least a portion of each leg can flex in response to force.

18 Claims, 37 Drawing Sheets

(56) References Cited

U.S. PATENT DOCUMENTS

| | | |
|---|---|---|
| 6,931,669 B2 | 8/2005 | Ashline |
| 7,430,768 B2 | 10/2008 | Batstone et al. |
| 7,765,623 B2 | 8/2010 | Ashline |
| 7,770,233 B2 | 8/2010 | Haskell |
| 8,074,294 B2 | 12/2011 | Bowlus et al. |
| 8,201,279 B1 | 6/2012 | Batstone et al. |
| 8,272,074 B1 | 9/2012 | Ashline |
| 8,375,472 B2 | 2/2013 | Ashline |
| 8,562,551 B2 | 10/2013 | Leatt |
| 9,351,529 B1 | 5/2016 | Ashline |
| 2004/0128748 A1 | 7/2004 | Monica |
| 2005/0015858 A1 | 1/2005 | Ashline |
| 2005/0108800 A1 | 5/2005 | White |
| 2009/0144886 A1* | 6/2009 | Stiles ................... A42B 3/0473 2/421 |
| 2010/0251467 A1* | 10/2010 | Leatt ................... A41D 13/0512 2/468 |
| 2011/0041240 A1* | 2/2011 | Mazzarolo ......... A41D 13/0512 2/468 |
| 2011/0225713 A1* | 9/2011 | Lopez Vicente ... A41D 13/0512 2/468 |
| 2012/0137418 A1* | 6/2012 | Nelson ............... A41D 13/0512 2/468 |
| 2012/0144568 A1 | 6/2012 | Nelson |
| 2013/0036538 A1* | 2/2013 | Sheren ............... A41D 13/0512 2/461 |
| 2013/0104295 A1* | 5/2013 | Darnell .................. B60N 2/806 2/410 |
| 2016/0213086 A1* | 7/2016 | Nagely ................ A42B 3/0473 |

OTHER PUBLICATIONS

Hubbard et al.; Biomechanical Evaluation and Driver Experience with the Head and Neck Support; Dec. 1994.
Stiles et al.; HANS Device—Performance Leader to Market Leader; 2007.
Stiles; HANS Photographs; 2013.
Nlascar; Safety Precautions; Supporting Safety; 2003-2008; downloaded from http://nascarrodcast.blogspot.com/p/safety-precautions.html on Sep. 26, 2013.
Search Report for European Patent Application No. 15198000; dated Apr. 1, 2016.

* cited by examiner

HEAD AND NECK RESTRAINT DEVICE WITH DYNAMIC ARTICULATION

FIELD

The present disclosure relates, in exemplary embodiments, to head and neck restraint systems, in particular to those systems used by race car drivers.

BACKGROUND

Head and neck restraint systems are known and are typically mandatory in racing events to help reduce injury and death during an incident, such as a car crash. Conventional high performance restraint systems typically include a safety belt, restraint device that is generally yoke-shaped and has a rigid collar portion that fits behind and partially around a user's neck and rigid stabilizing components that either fit over the upper torso front, down the upper torso back, or both, and that is associated with the safety belt, and a helmet attached to the restraint device by a tether system that allows for some degree of movement of the user's head.

Conventional high performance restraint devices are constructed such that the collar portion and the stabilizing components are rigidly fixed with respect to each other to act as one monolithic structure. The rigidly fixed relationship between the collar portion and the stabilizing components is a compromise driven by fit and comfort that influences the kinematics and analytical dynamics of the system such that the optimum desirable biomechanical characteristics to protect the user during an incident may not be achieved and, therefore, the user's ultimate safety may be compromised.

Furthermore, the rigidly fixed relationship between the collar portion and the stabilizing components of conventional high performance restraint devices inhibit a user from readily using a restraint device designed or configured for one seat and seating recline angle in other seats and seating recline angles, for example in different types of race cars. This may require a user to invest in multiple different restraint devices for each different race car they operate in order to provide adequate fit and comfort such that the user's safety is not compromised. Due to the influence of body type on effective seating recline angles, this may also require race teams to invest in multiple different restraint devices for users of the same race car with different body types in order to provide adequate fit and comfort for each user such that no user's safety is unnecessarily jeopardized. It also limits the opportunities for users to share a restraint device.

In addition, mass production economics dictate that the rigid stabilizing components of conventional high performance restraint devices have to be manufactured in a limited range of body contouring shapes yet still aim to meet the needs of a wide range of user body types. Manufacturers offer a variety of supplementary padding systems to try to help mask the resulting inherently limited fit and comfort. These padding systems have variable degrees of success in addressing comfort and fit and may introduce an additional level of instability into the systems such that a user's ultimate safety may be compromised.

It would be desirable to have a restraint device that, by permitting a degree of relative articulating movement of the collar with respect to the stabilizing components, improves the biomechanical performance of the restraint system and allows for one restraint device to be used by a wide variety of different users in a wide variety of different seat and seat recline angles, and by the manner of construction of its stabilizing components offer enhanced standards of comfort, fit and reliability.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to the more detailed description below.

Generally described, the present disclosure provides in one exemplary embodiment a head and neck restraint device for high performance race car drivers, comprising a yoke having sidewings, a collar and a pair of legs, the legs adapted to be pivotably associated with the sidewings. The collar can pivotably articulate with respect to the legs. The legs have at least a portion that can flex in response to force.

One exemplary embodiment provides a head and neck restraint device, comprising a yoke having a base portion, a stand-up collar portion, a first sidewing having a first connector member, and, a second sidewing having a second connector member. The device further comprises first and second legs, each leg having a proximal portion, a distal portion, a front surface, a rear surface, and a connector member pivotably associated with a sidewing connector member such that each leg is capable of limited pivoting articulation with respect to the sidewing.

Other features will become apparent upon reading the following detailed description of certain exemplary embodiments, when taken in conjunction with the appended claims.

BRIEF DESCRIPTION OF THE DRAWINGS

The drawings disclose exemplary embodiments in which like reference characters designate the same or similar parts throughout the figures of which.

DETAILED DESCRIPTION

Unless otherwise indicated, the drawings are intended to be read (for example, cross-hatching, arrangement of parts, proportion, degree, or the like) together with the specification, and are to be considered a portion of the entire written description of this invention. As used in the following description, the terms "horizontal", "vertical", "left", "right", "up" and "down", as well as adjectival and adverbial derivatives thereof (for example, "horizontally", "upwardly", or the like), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 1:
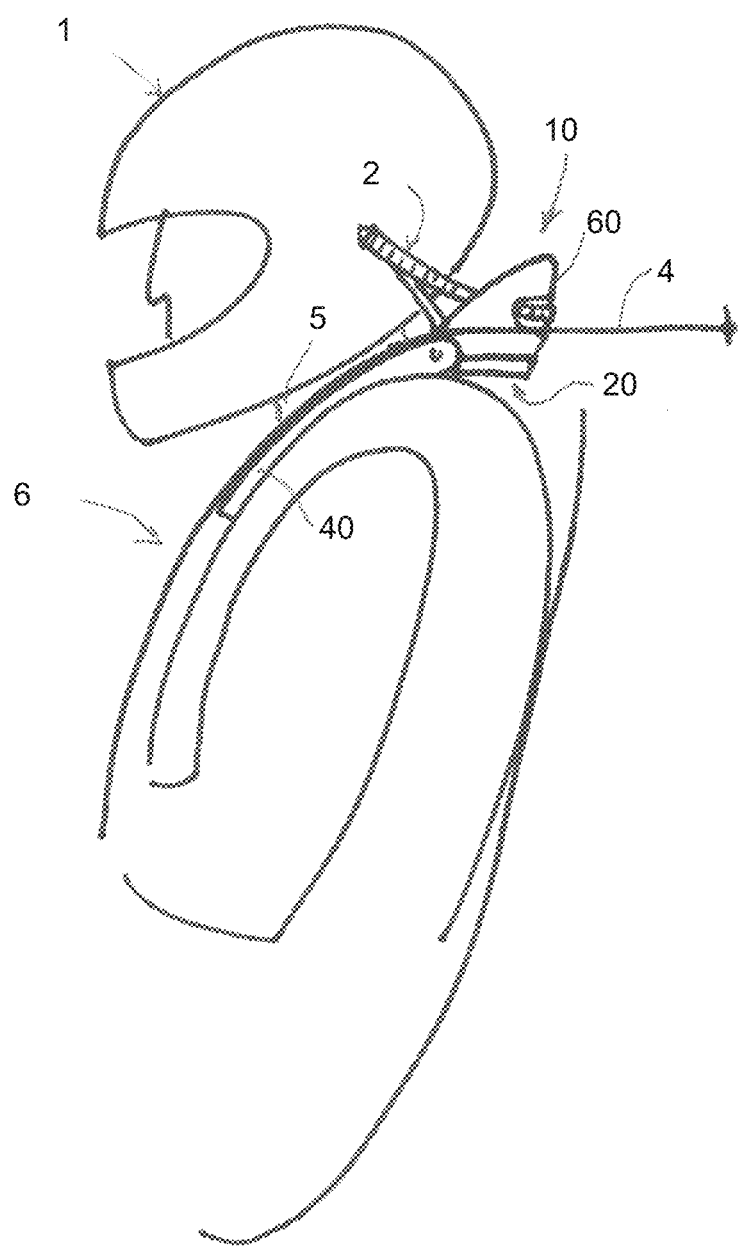
FIG. 1 is a schematic view of a user wearing a head and neck restraint device and helmet.

A race car driver typically will have a helmet 1, tether 2 and safety belt 4 (an example of which is shown in FIG. 1) that is part of a safety restraint system. The driver is illustrated as having a neck 5 and upper torso 6. In exemplary embodiments, a head and neck restraint device 10, as shown in FIGS. 2-5, for use with a helmet 5, tether 7 and safety belt 9 generally includes a yoke 20, collar 60, and a pair of legs, 40, 50. In exemplary embodiments, the yoke 20 may be constructed of one or more materials, such as, but not limited to, carbon-reinforced nylon so as to provide a generally rigid structure. In exemplary embodiments, the legs 40, 50 may be constructed of one or more materials, such as, but not limited to, a thermoplastic elastomer. In exemplary embodiments, the legs may comprise polyurethane, polypropylene, or the like.

In exemplary embodiments, the yoke 20 includes a base member 52 having a first sidewing 54 and a second sidewing 56 and a middle portion 58. The yoke further includes a collar 60 extending upward from generally the middle portion 58 of the base member 52. The collar 60 may be formed as part of the base member 52, or may be a separate component that is associated with the base member 52 (as described further hereinbelow). The collar 60 may have at least one opening 62 that can receive a tether 2 from a helmet tether system. In exemplary embodiments, a collar 60 has two openings 62, as shown in FIG. 1 such that the tether 2 can pass through both openings. In exemplary embodiments, a collar 60 may have a single opening, or other features such as, but not limited to, loops, clips, straps, or the like to retain, guide or secure the tether. The tether system is described in greater detail hereinbelow.

Figure 15:
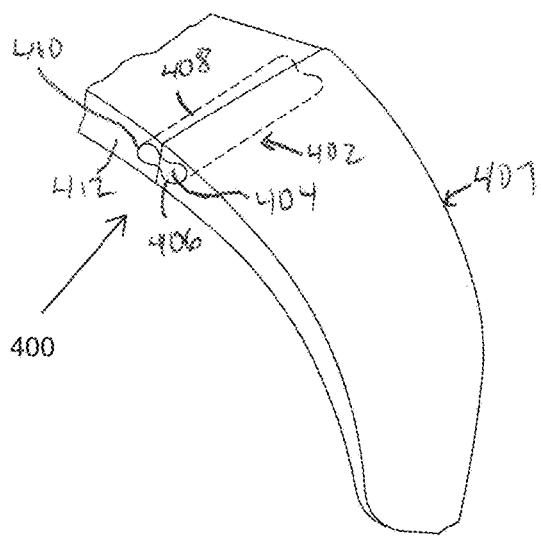
FIG. 15 is a perspective view of a portion of a leg and sidewing showing the connector mechanism of the exemplary embodiment of FIG. 14.

In exemplary embodiments, the collar 60 has a helmet tether system 70 comprising a tether strap 2, tether anchor 72, tether clip 74 and a means for attaching the tether 2 to the collar 60 such as shown in FIG. 15. In exemplary embodiments, the attachment means comprises a tether anchor fastener 76. The fastener 76 may be a bolt or screw, grommet or other fastener known to those skilled in the art that attaches the tether anchor 72 to the collar 60. In exemplary embodiments, the collar 60 has an opening 80, which may be a slot, channel, groove, recessed area or the like, in which a tether or tethers 2 may be inserted and held in place by the fastener 76 such that the tether anchor 72 is capable of limited pivoting movement. The tether 2 passes through an opening in a tether clip 82. The tether clip is adapted to attach to the helmet 1.

Figure 5:
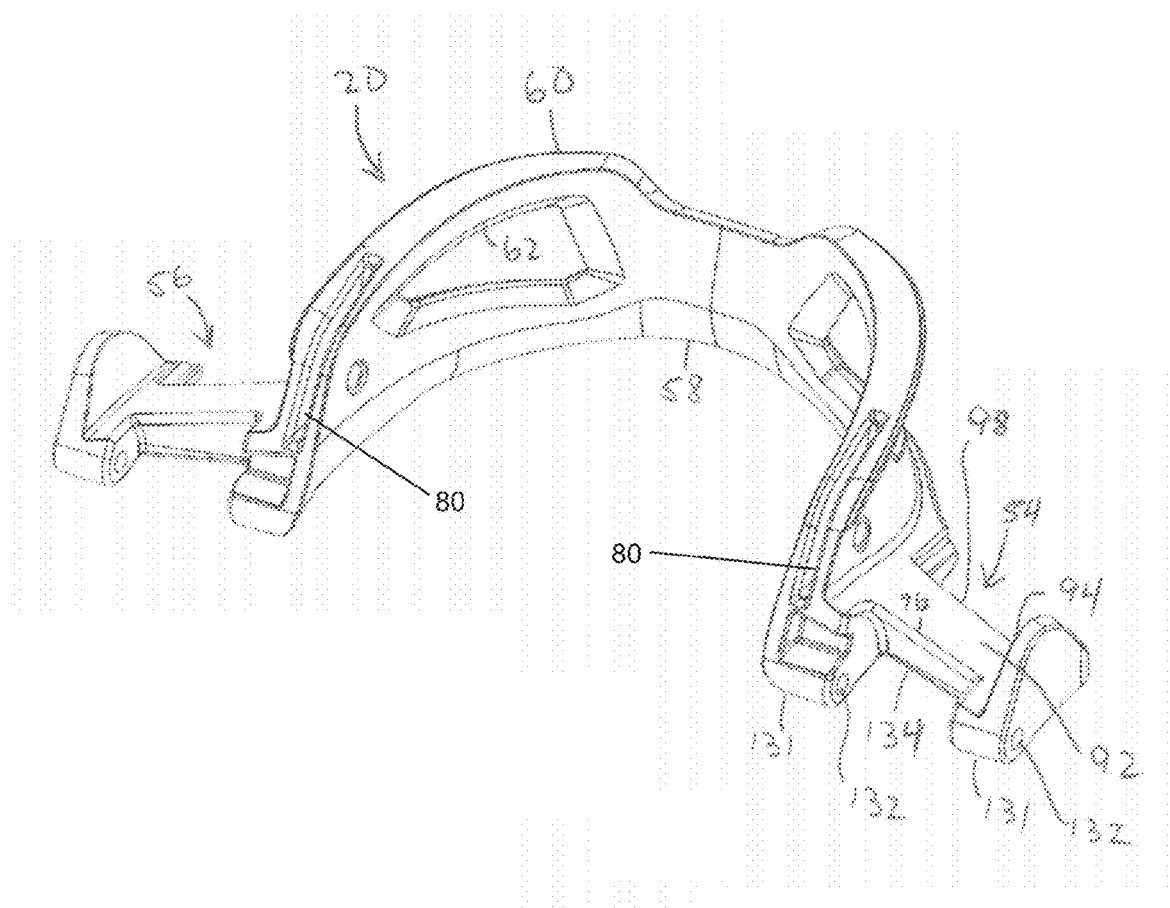
FIG. 5 is a front perspective detail view of the yoke and collar of the exemplary embodiment of FIG. 2.
Figure 5A:
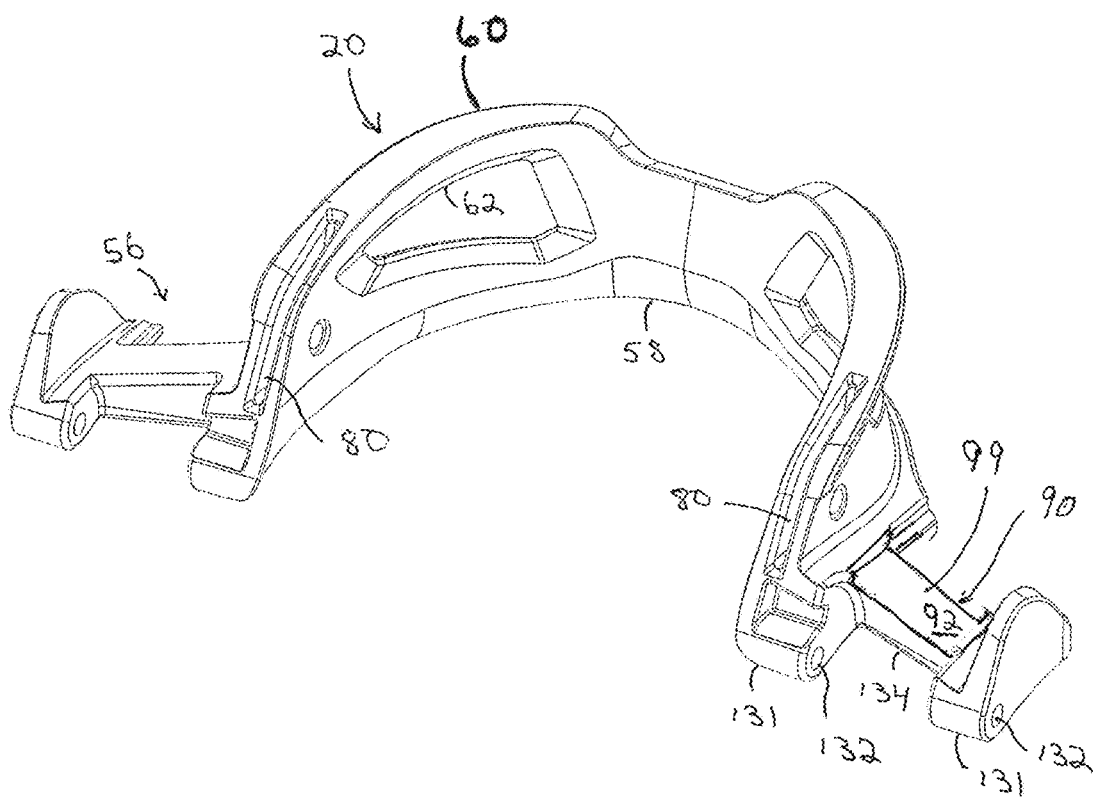
FIG. 5A is a front perspective detail view of the yoke and collar of the exemplary embodiment of FIG. 2 shown with an alternative embodiment of a guide channel 99.
Figure 39:
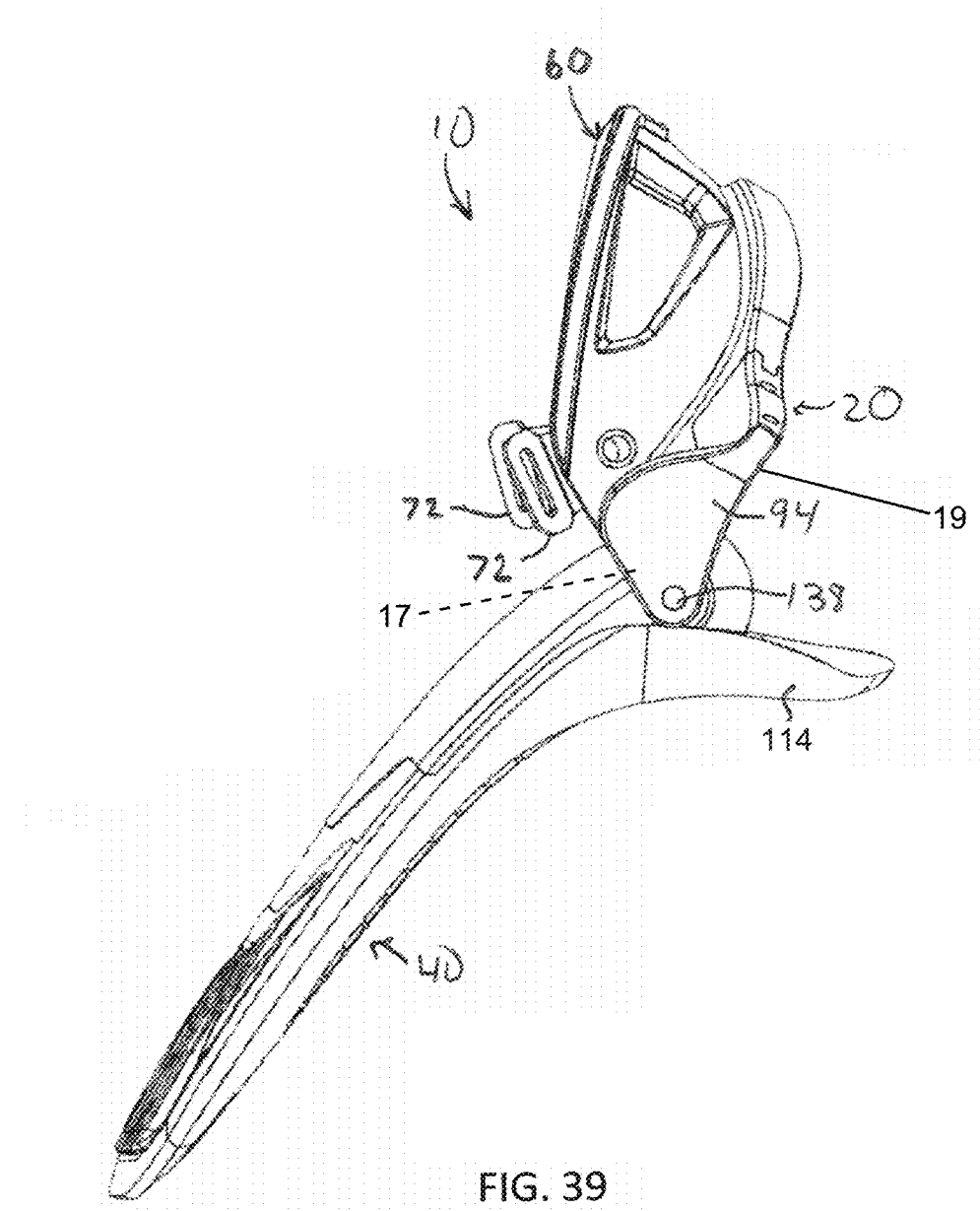
FIG. 39 is a left side view of the device of FIG. 38.

In exemplary embodiments, the first and second sidewings 54, 56 each include a safety belt guide 90. In exemplary embodiments, the guide 90 may be formed by a base surface 92 (sometimes referred to as a top surface of the sidewing) and a first sidewall portion 94 extending upward from the base surface or from the side of the sidewing 54, 56. Each sidewing 54, 56 is also formed to define a bottom surface 19 opposite from the top surface (as shown in FIG. 39 for example). In exemplary embodiments, a second sidewall portion may be included. The sidewing has a front edge 96 and a rear edge 98. Alternatively, the guide 90 may be a flat or curved recessed area or guide channel 99 in the base surface 92 (as shown in FIG. 5A in sidewing 54). The guide 90 is adapted to receive a portion of a safety belt 4. The guide 90 maintains the safety belt 4 in alignment with (i.e., generally passing over) the legs 40, 50 when worn by a user. In exemplary embodiments, the base surface 92 may be curved from front edge 96 to rear edge 98 so as to provide a cammed surface.

In exemplary embodiments, the length from the front edge 96 to the rear edge 98 of the sidewings 54, 56 can be designed to optimize the biomechanics of the device 10. The front-to-rear length can also be considered in design of the device 10 so that the pivot point where each sidewing and leg connects (as described in detail hereinbelow) can be moved forward or rearward (toward the front or the rear edge, respectively, of the sidewing) to optimize biomechanical performance.

In exemplary embodiments, each sidewing 54, 56 also includes a leg connector portion 120 adapted to be connected to a leg 40 or 50, as described in further detail hereinbelow.

Each leg 40, 50 comprises a distal portion 110, a proximal portion 112, a proximal end 114, a top surface 116, a bottom surface 118, and a connector portion 120. In exemplary embodiments, the proximal portion 112 is generally rigid. In exemplary embodiments, the proximal end 114 is in the form of a flap that extends from the proximal portion 112 of each leg 40, 50. In exemplary embodiments, the legs 40, 50 may be made of a thermoplastic elastomeric material, such as, but not limited to, polyurethane, polypropylene, and the like. In exemplary embodiments, at least a portion of the distal portion 110 has a degree of flexion, which may be achieved in any of several different ways, as described in greater detail hereinbelow. The legs 40, 50 may be constructed of a single material, different materials, layers of materials, segments of materials, combinations of the foregoing or the like. In exemplary embodiments, as viewed from the side (see FIG. 3) the leg curves to generally conform to a portion of a user's torso. In exemplary embodiments, the bottom surface 118 may be cushioned or have a degree of deformability to improve fit, wearing comfort and biomechanical performance, e.g., to absorb force during an incident. A degree of flexion also improves conformity with the proximate bone structure beneath the legs 40, 50 and improves stability. In exemplary embodiments, the cushioning may be a layer of compressible material. In exemplary embodiments, the cushioning may be achieved by a rubber or rubber-like material layer having ribs or other patterning on the surface that is deformable or compressible.

In exemplary embodiments, selected portions of the bottom surface 118 may be deformable or cushioned while other portions may not be. In exemplary embodiments, selected portions of the bottom surface 118 may have more cushioning or deformability than other portions. In exemplary embodiments, the bottom surface 118 may include a gradient of cushioning or deformability either widthwise or lengthwise.

In exemplary embodiments, the top surface 116 may optionally incorporate one or more grooves or channels that are adapted to mate with mating grooves or channels on the underside of the safety belt strap. Such mating groove system is commercially available under the brand Slip-Stop™ by Schroth Safety Products GmbH (Germany), and is disclosed in U.S. Pat. No. 7,017,194, the entire disclosure of which is incorporated herein by reference.

Figure 6:
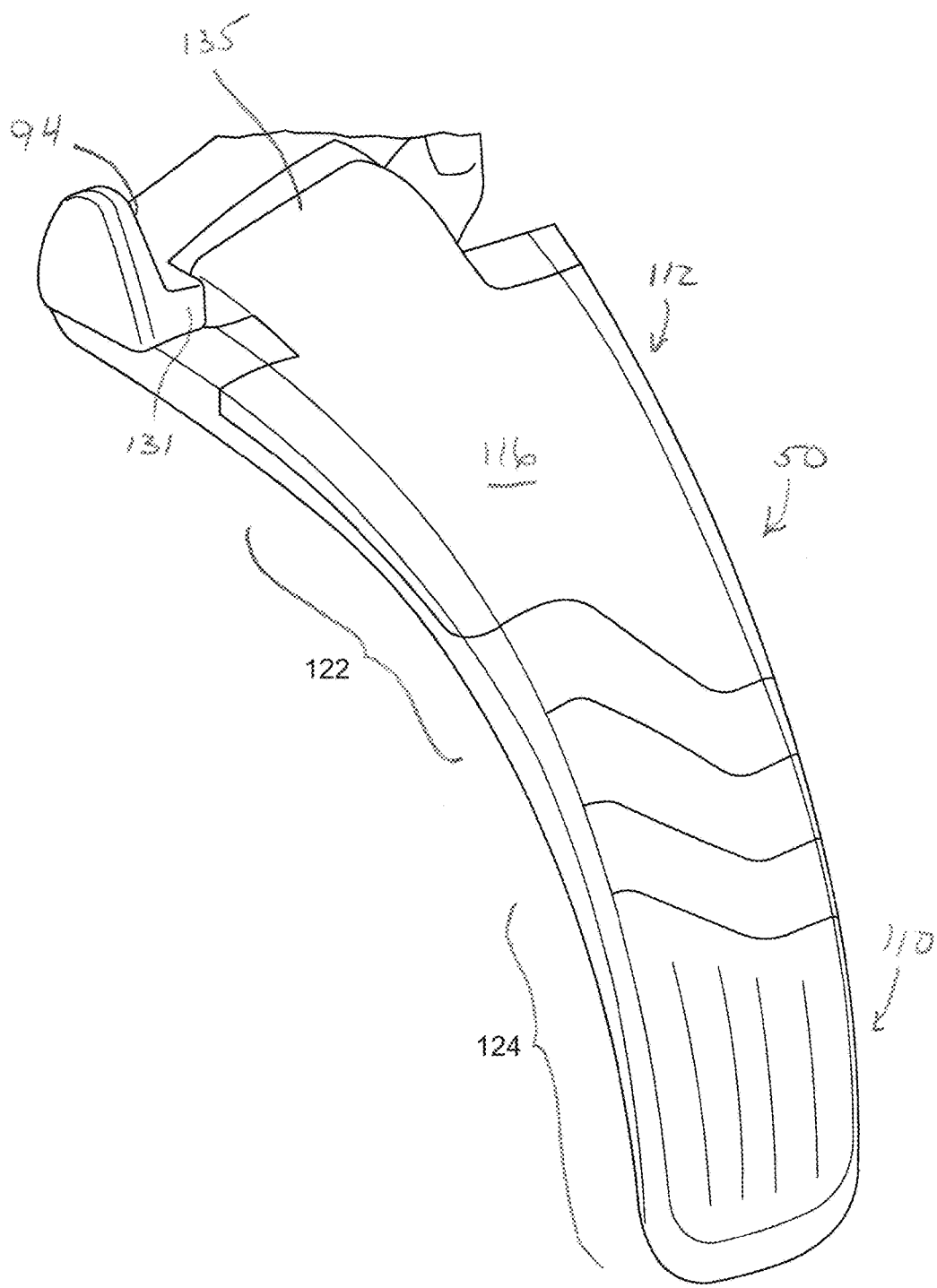
FIG. 6 is a perspective view of a leg having different areas of flexibility and rigidity according to one exemplary embodiment.

In exemplary embodiments, selected portions of the leg proximal portion are flexible while others are rigid. In exemplary embodiments, as shown in FIG. 6, the legs may have at least one zone 122 that is rigid and at least one zone 124 that is flexible.

In exemplary embodiments, portions of the leg may be generally rigid or of lower flexibility than other portions so that the leg overall maintains proximity of the pivot area close to the safety belt, which spreads the force load on the safety belt out over the user's body and maintains the device kinematics.

In exemplary embodiments, the area or region dividing the distal portion 110 (generally rigid) from the proximal portion 112 (at least a portion being flexible) may be positioned along the leg 40, 50 either closer to or farther from the connector portion 120 to achieve desired fitting and biomechanical performance criteria.

In exemplary embodiments, the leg top surface and bottom surface materials can be modified to have desirable smoothness and coefficient of friction characteristics. The coefficient of friction on the top surface 116 can be important as it can increase or decrease the drag on the safety belt 4, and on the bottom surface 118 it can be important to increase or decrease the drag on the user's clothing.

Figure 7:
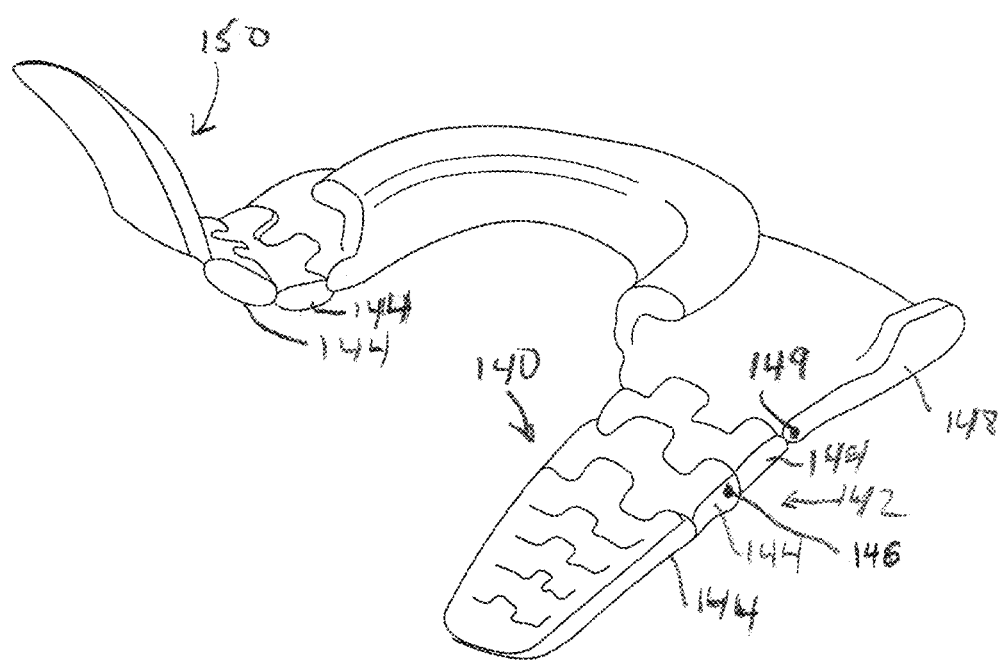
FIG. 7 is a schematic view of a portion of a leg comprising several links, according to one alternative exemplary embodiment.
Figure 8:
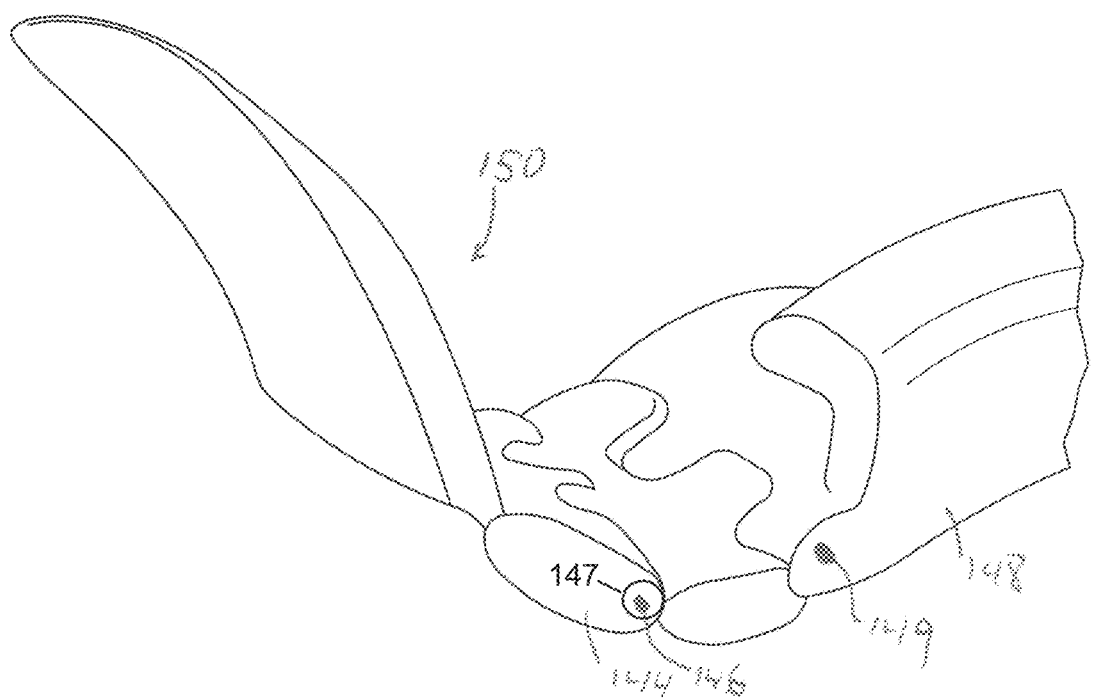
FIG. 8 is schematic view of a detail of the exemplary embodiment of FIG. 7.
Figure 9:
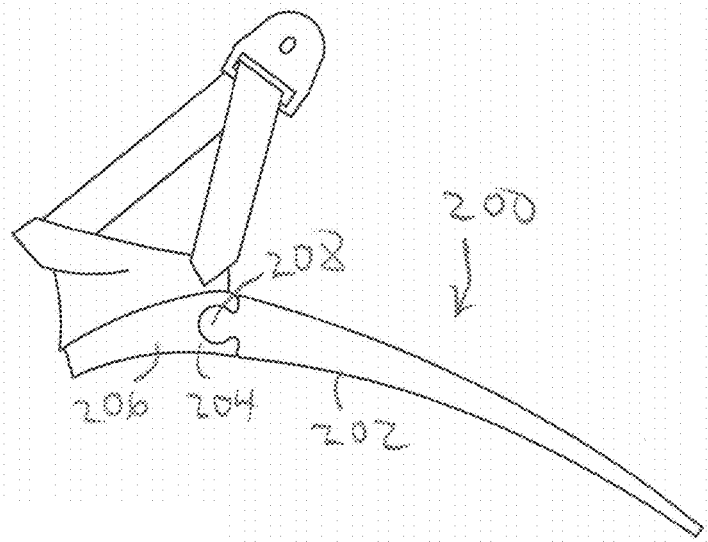
FIG. 9 is a side elevational cutaway view of a leg-yoke connection mechanism according to one alternative exemplary embodiment.
Figure 10:
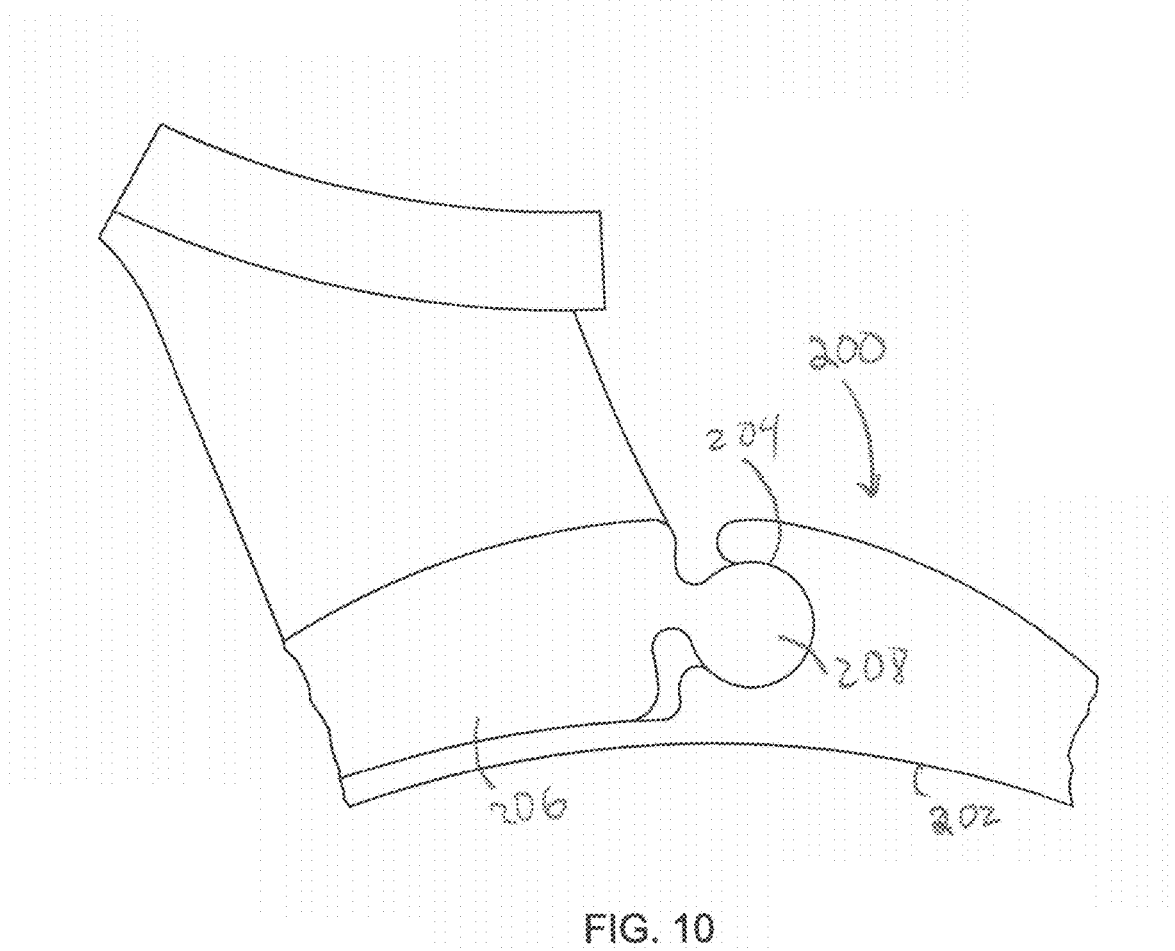
FIG. 10 is a side elevational detailed cutaway view of the leg-yoke connection mechanism of FIG. 9 showing an option, according to an exemplary embodiment in which a portion of the leg extends under the collar.

In one alternative exemplary embodiment of the legs 40, 50, shown in FIGS. 7-8, a leg 140 may be constructed having a proximal segment 142, and a plurality of links 144, each link being pivotably connected to adjacent links, such as, but not limited to, by a pin 146 passing through a bore in the link. The proximal segment 142 is pivotably connected to a sidewing 148 by a pin 149 or other pivotable means. Each link pivot area is capable of a limited degree of pivoting or bending with respect to its adjacent neighbor as illustrated by leg 150 in FIG. 8, resulting in at least a portion of the legs 140, 150 having limited flexion.

Figure 2:
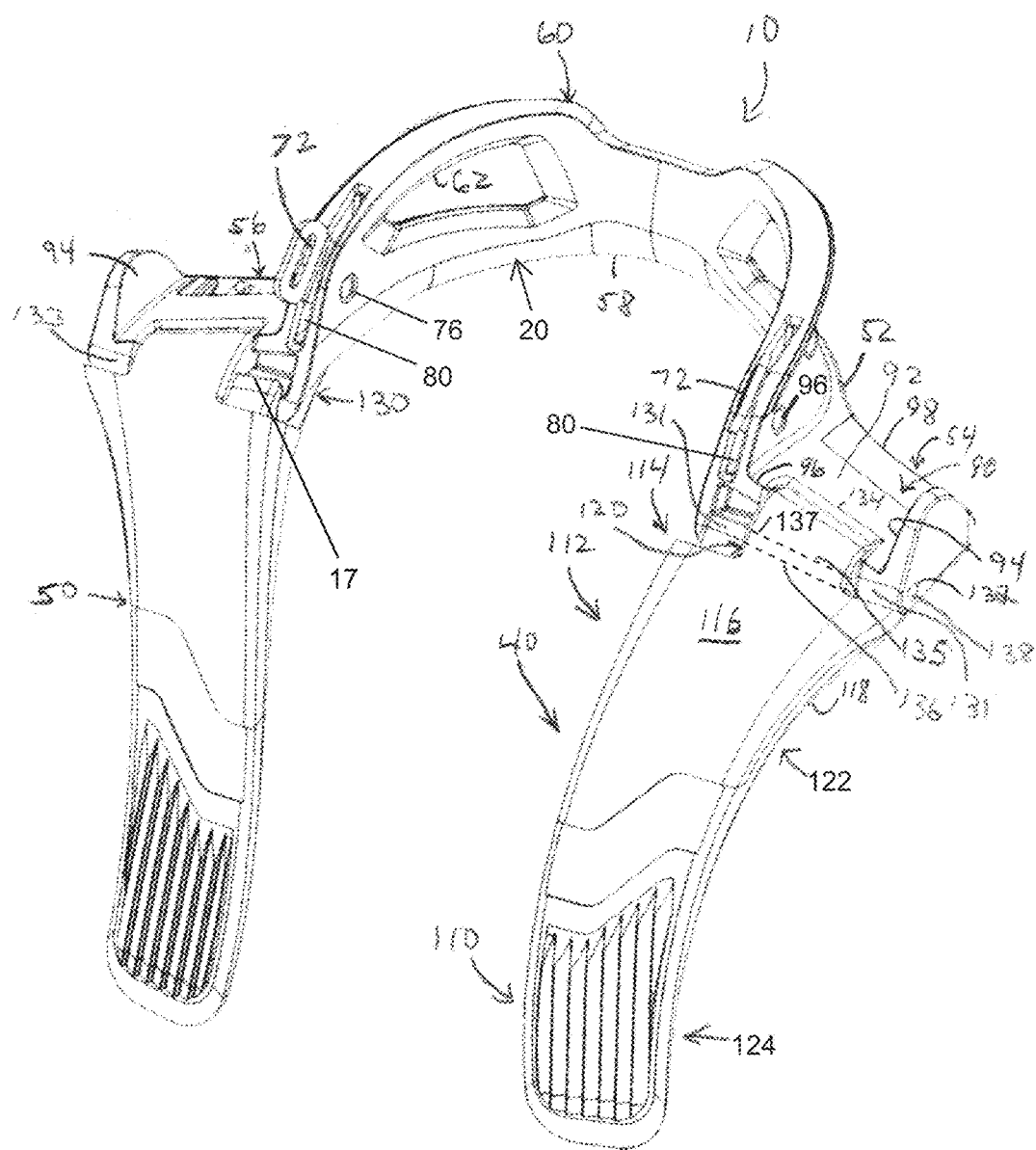
FIG. 2 is a front perspective view of a head and neck restraint device according to one exemplary embodiment, as shown in the nonarticulated position.

In exemplary embodiments, as shown in FIG. 2, a connector mechanism is generally noted as 130. In exemplary embodiments, a connector mechanism 130 may comprise a hinge system that includes first and second hinge knuckles 131 associated with each sidewing 54, 56. Each knuckle 131 has a bore 132 extending at least partially therethrough. Each knuckle 131 has a knuckle face 133. Between the knuckles 131 is a recessed area 134. In exemplary embodiments, the connector mechanism 130 also includes a knuckle 135 extending from the proximal portion end 136 of the leg. The leg knuckle 135 has a bore 137 extending at least partially therethrough. A portion of the leg knuckle 135 is sized to fit within a portion of the sidewing recessed area 134. In exemplary embodiments, a pin 138 extends through the first sidewing knuckle bore 132 and at least a portion of the second sidewing knuckle bore and through the leg knuckle bore 137 so as to hingedly connect the sidewing 54 and the leg 40.

In an alternative exemplary embodiment, the connector mechanism may comprise more than two knuckles associated with the sidewing and more than one leg knuckle, with the leg knuckles being interposed between adjacent sidewing knuckles, similar to a door hinge in general construction.

Figure 11:
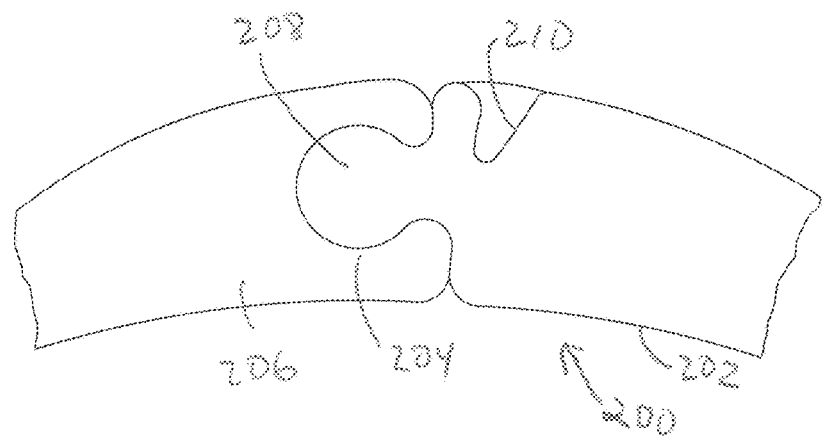
FIG. 11 is a side elevational cutaway view of the leg-yoke connection mechanism of FIG. 9 and including an optional dampener.
Figure 12:
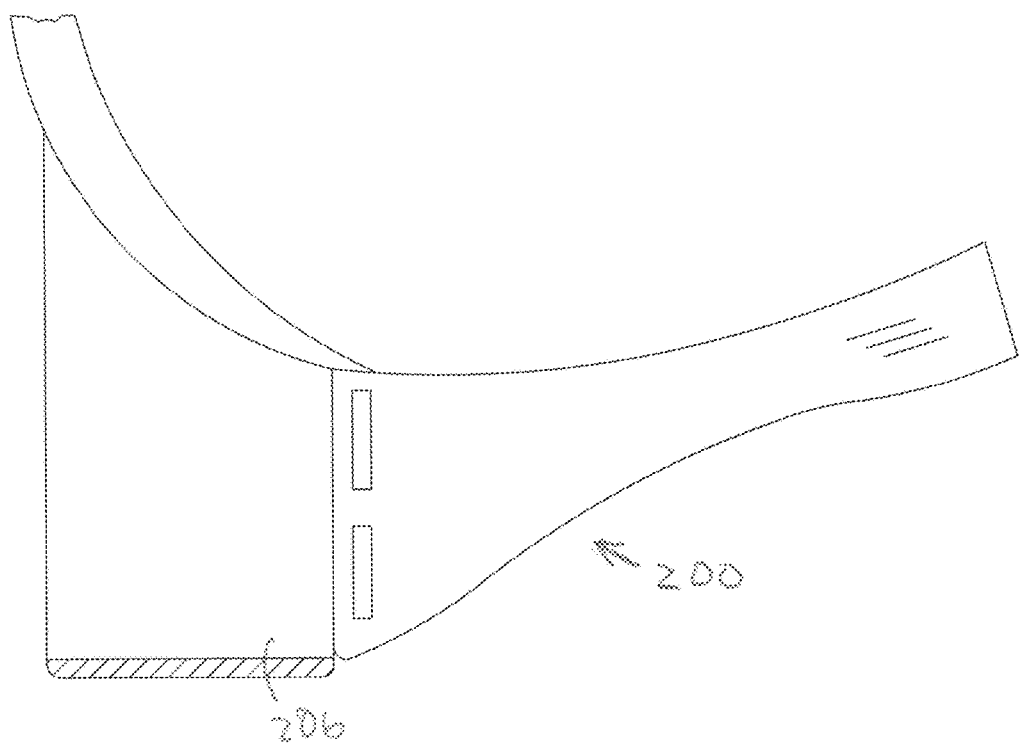
FIG. 12 is a top plan view of the connection mechanism of FIG. 11.

In another exemplary embodiment of the legs and connection to the yoke, as shown in FIGS. 9-12, a connection mechanism includes a leg 200 having a proximal portion 202 having a socket 204 and a sidewing 206 having a ball 208 whereby the ball 208 is receivable within the socket 204 and is capable of limited articulation movement. In an alternative of this exemplary embodiment (not shown), the ball and socket are switched, i.e., the leg proximal portion includes a socket and the sidewing includes a ball. Optionally, as shown in FIGS. 11-12, the leg proximal portion 202 includes at least one wedge-shaped recess 210 or a recess of a different shape that can act as a dampener (as discussed in greater detail hereinbelow). In an exemplary embodiment, one or more wedge-shaped recesses may have inserted therein or associated therewith a dampener, such as a solid or other construction of deformable or compressible material, as described hereinbelow.

Figure 13:
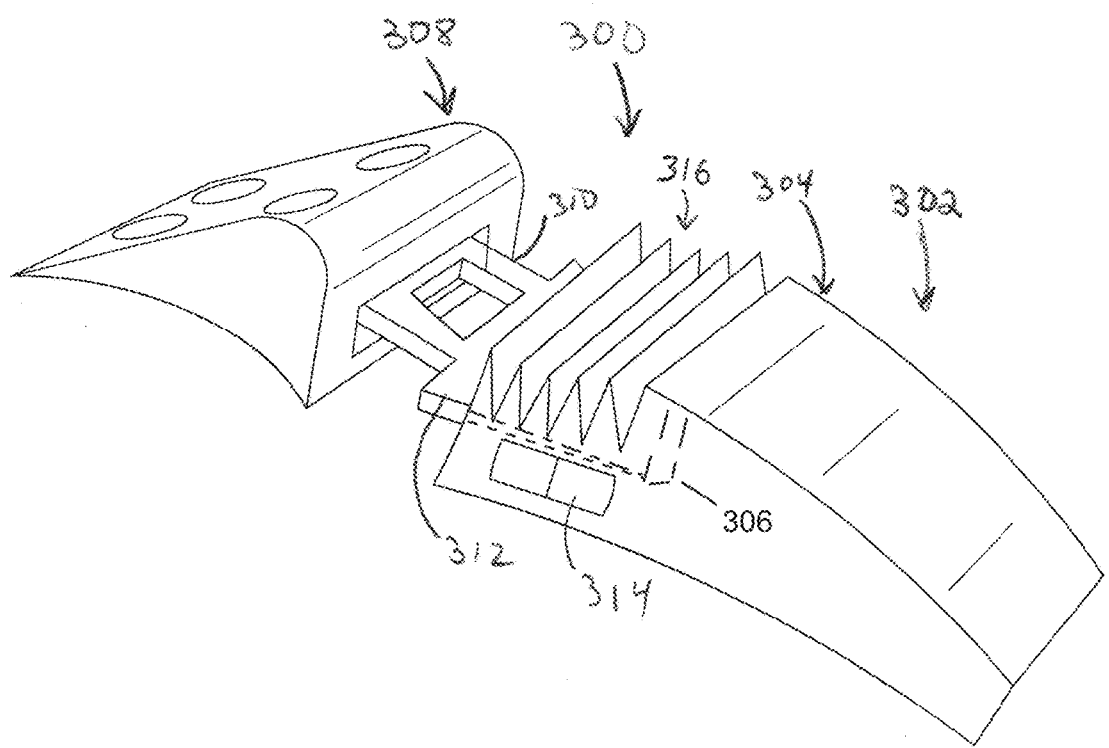
FIG. 13 is a perspective view of a connector mechanism according to one alternative exemplary embodiment.

In an alternative exemplary embodiment, as shown in FIG. 13, a connector mechanism 300 may comprise a leg 302 having a proximal end 304 including a slot 306 and a sidewing 308 having a tab 310 having at least one engaging portion 312 that can be received in the slot 306. The slot may include a release lock mechanism 314, such as, but not limited to, one of the types commonly used in occupant restraint systems employed in passenger vehicles or airplanes that can extend to engage the tab engaging portion. In exemplary embodiments, the engaging portion may be one or more barbs. In exemplary embodiments, the engaging portion may be a complementary aperture in the tab to engage with a release lock mechanism, for example, a prong, post or other structure which engages with the tab to releasably lock the leg and the sidewing. The proximal portion 304 of the leg 302 may include a plurality of accordion-like rib portions 316 that can act as a dampener (as further discussed hereinbelow). In this embodiment the leg 302 is releasable from the sidewing 308 by actuating or deactuating the release lock mechanism 314.

Figure 14:
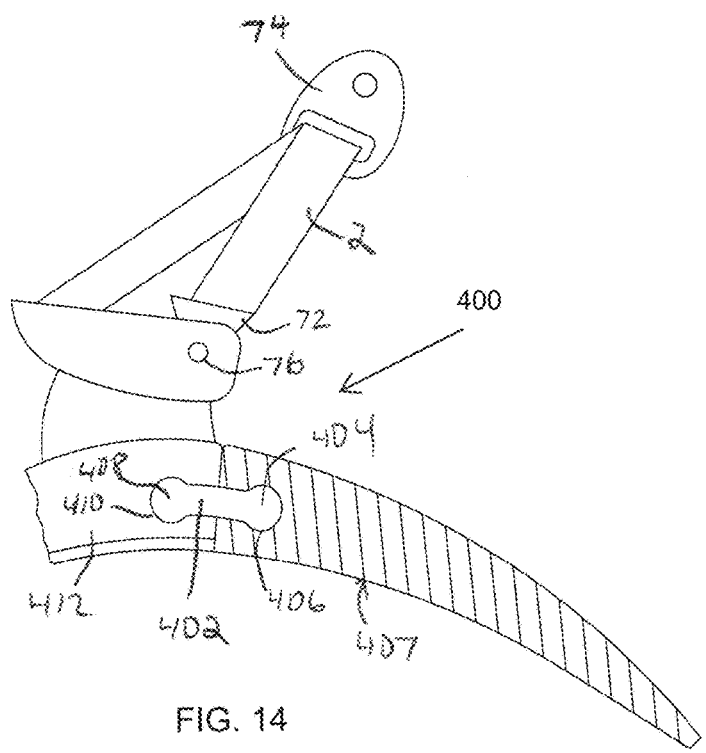
FIG. 14 is a side elevational cutaway view of a connector mechanism according to another alternative exemplary embodiment.

In an alternative exemplary embodiment, as shown in FIGS. 14-15, a connector mechanism 400 is shown which comprises an insert 402 that has a generally dumbbell-shaped cross-section (when viewed from the side, as in FIG. 14) and a generally rectangular, sheet-shape (when viewed from the top, as shown in FIG. 15) that has a first portion 404 received within a groove or channel 406 in a leg 407 and a second portion 408 that is received within a groove or channel 410 in the sidewing 412. In exemplary embodiments, the insert 402 may be made of a material having a degree of flexibility or elasticity. In exemplary embodiments, the insert 402 may be made of a thermoplastic elastomeric material. In exemplary embodiments, the leg 407 may be made of a semi-rigid material.

Figure 16:
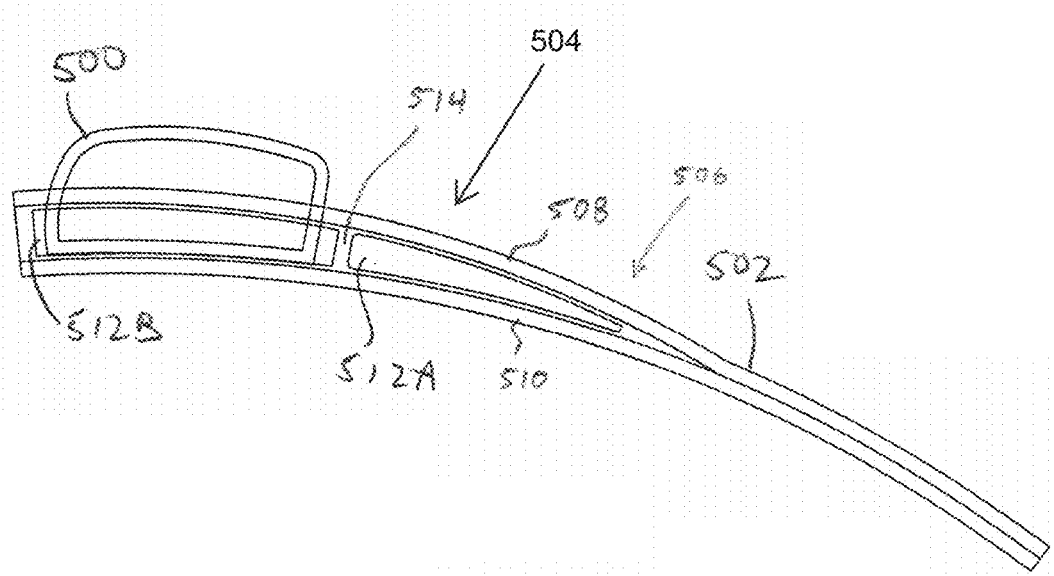
FIG. 16 is a side elevational cutaway view of a leg and sidewing configuration according to another exemplary embodiment.
Figure 17:
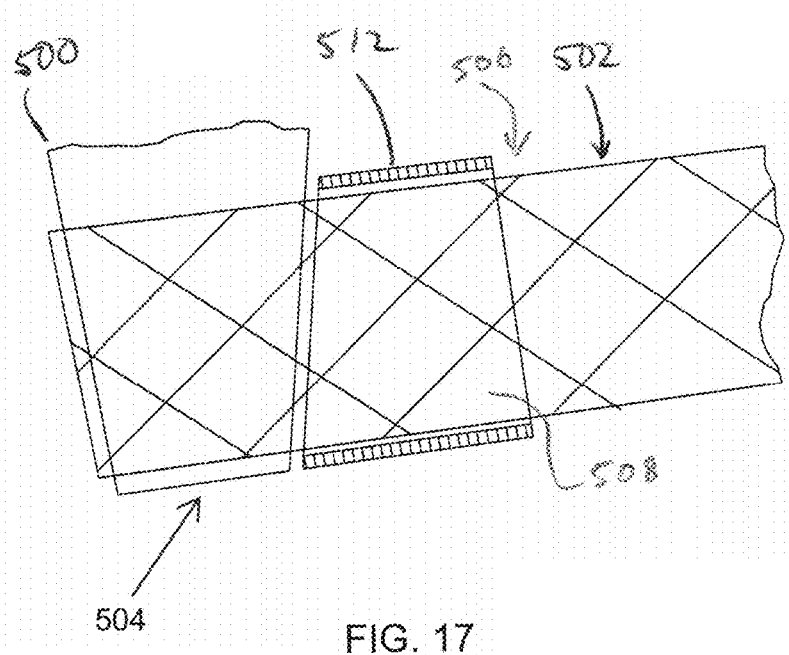
FIG. 17 is a top plan view of the embodiment of FIG. 16 showing a configuration according to one exemplary embodiment.

In an alternative exemplary embodiment, as shown in FIGS. 16-17, a device may have a sidewing 500, a leg 502 and a connector mechanism 504, whereby the leg 502 comprises a proximal portion 506 including or made at least partially of a fabric (woven or nonwoven), plastic, rubber, mesh or other semi-rigid or flexible material. In one exemplary embodiment, the proximal portion 506 has at least two layers. In one exemplary embodiment, the proximal portion 506 has a top layer 508 and a bottom layer 510. Sandwiched between the layers is at least one segment 512 of a generally rigid or semi-rigid material, each segment 512 being disposed in a discrete pocket or recess 514 between the layers. In exemplary embodiments, the proximal portion 506 of the leg 502 has a pocket or recess 514 with an opening in the side and is connected to a sidewing 500 by sliding the pocket 514 over the sidewing 500 and fastening the two parts together with one or more fasteners (not shown), such as, but not limited to, screws, bolts, staples, clips, or the like. FIG. 16 shows one embodiment in which two segments 512A each and 512B having adjacent ends that are in a butt joint relationship (i.e., the ends are parallel to each other). FIG. 17 shows an exemplary embodiment featuring a segment 512 having a wedge shape.

Figure 18:
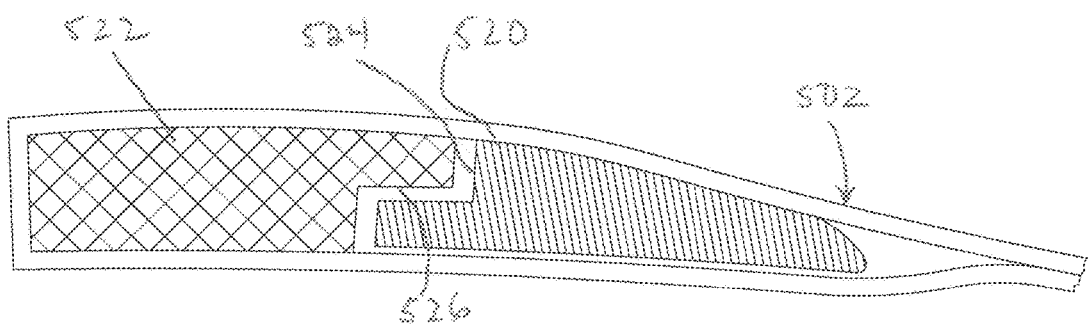
FIG. 18 is a side elevational cutaway view of a connector mechanism according to another alternative exemplary embodiment.

In a variation of the foregoing embodiment of FIGS. 16-17, a segment 520 and sidewing 522, as shown in FIG. 18, may have a lap joint area in which the segment 520 has a notch 524 and the sidewing 522 has a notch 526, with the notches overlapping.

Figure 19:
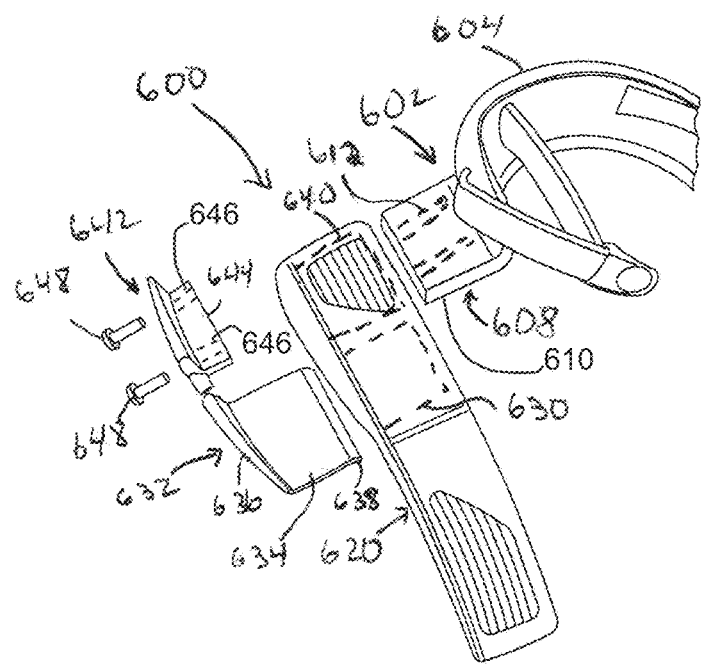
FIG. 19 is a perspective partial exploded/disassembled view of a leg and sidewing connection mechanism according to another alternative exemplary embodiment.
Figure 20:
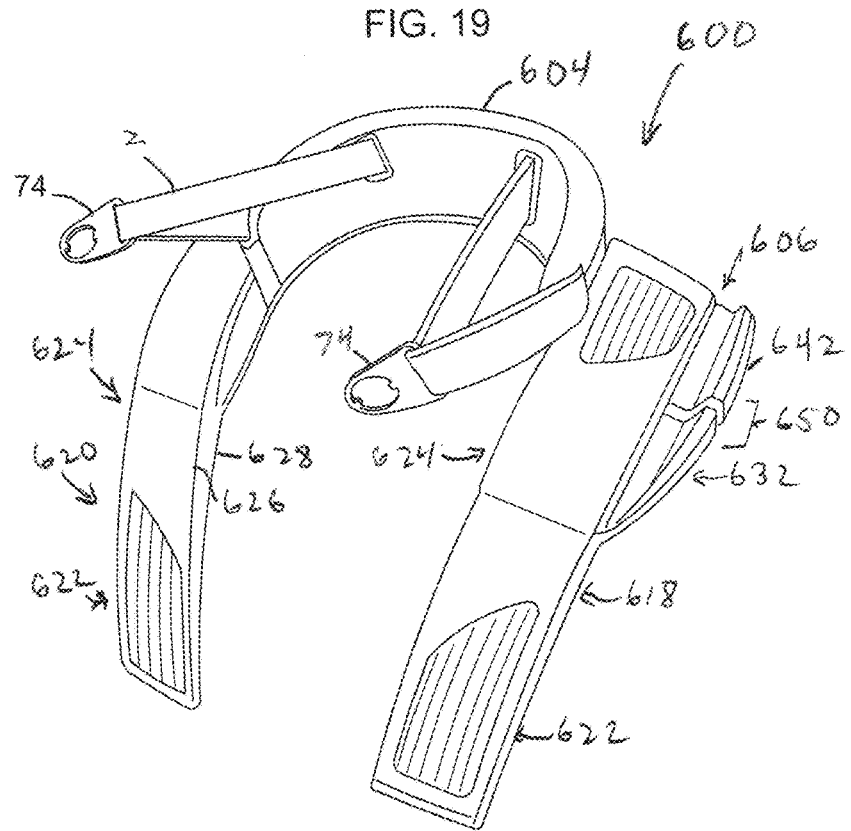
FIG. 20 is a perspective view of an assembled device of the exemplary embodiment of FIG. 19.

In another alternative exemplary embodiment, shown in FIGS. 19-20, a device 600 is provided having a yoke 602 with a collar 604 and sidewings 606, 608. Each sidewing has a tongue portion 610 having an aperture 612, and, in exemplary embodiments, two or more, apertures 612, that can receive a fastener 616. The device 600 has a pair of legs 618, 620 each leg having a distal portion 622 and a proximal portion 624. At least a portion of the legs 618, 620 comprises a top layer 626 and a bottom layer 628 (and, optionally, additional inner layers, not shown) made of or incorporating a flexible material, such as the material described hereinabove with respect to the proximal portion 506 flexible material. The proximal portion 624 of the legs 618, 620 includes a first slot 630. A sidewall 632 may be generally L-shaped and may comprise an engaging portion 634 and a sidewall portion 636. The engaging portion 634 can be received in the first slot 630 of the leg. In exemplary embodiments, the engaging portion 634 may further include a lip 638 along one edge. The leg proximal portion 624 further includes a second slot 640 that can receive at least a portion of the sidewing tongue 610. Each leg 618, 620 is connected to the respective sidewing 606, 608 by a generally L-shaped mount 642 that has an engaging portion 644 having at least one, and in exemplary embodiments, two, apertures 646 through which can be inserted a fastener 648, such as, but not limited to, a screw or bolt. The fastener 648 is threaded into the mount apertures 646 and also into the sidewing apertures 612, and tightened. The unit thus formed provides a sidewall that forms part of the safety belt guide, as described hereinabove. Each leg 618, 620 has a flexible or pivot zone 650 generally between, around and/or proximate to the first and second slot areas 630, 640 that permits articulation of a portion of the legs 618, 620 with respect to the yoke 602. This embodiment has the feature of not requiring a pivot pin. In various exemplary embodiments shown in FIGS. 16-20, the flexible material of the proximal portion can flex and/or deform to permit the relative movement of the segment, sidewing and/or distal portion to permit overall articulating movement of the leg.

Figure 21:
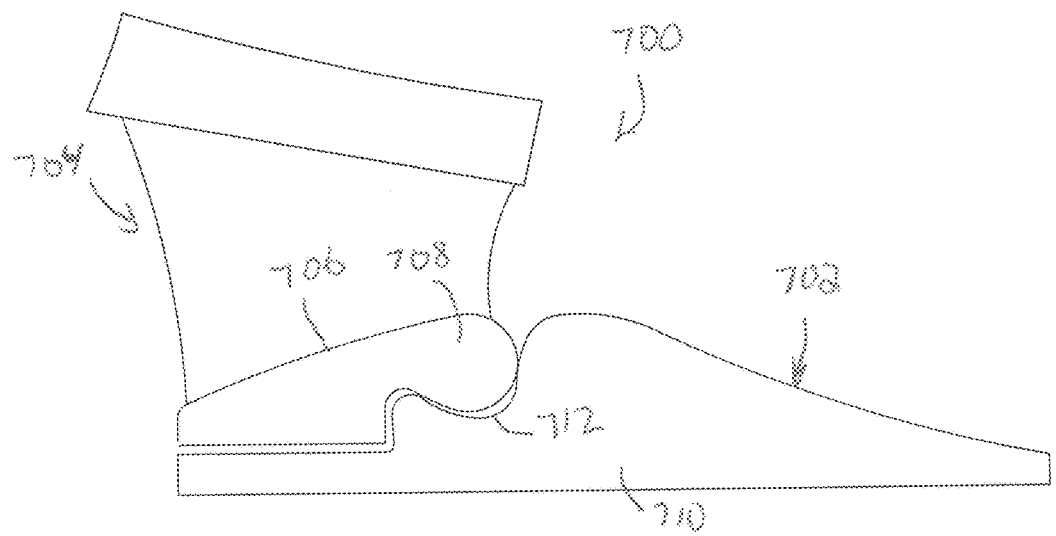
FIG. 21 is a right side elevational view of a leg and sidewing connection mechanism featuring a modified lap joint, according to another alternative exemplary embodiment.

In another exemplary embodiment, as shown in FIG. 21, a device 700 may have a leg 702, a sidewing 704 that connects at an overlap joint area and may include a modified lap joint in which a first piece 706 has a rounded male end 708 and a second piece 710 has a mating recessed or grooved female end 712. In the exemplary embodiments illustrated in FIGS. 16-18 and 21, the construction permits the collar to articulate around the proximal leg joint while providing a high resistance in shear in an area where high shear capacity is desirable. Additionally, the construction permits the proximal and distal leg components to articulate/conform to the user's torso where the issue is providing a mechanism that stabilizes the collar and proximal leg components by "pinching" the distal leg component to conform to the user's torso in a comfortable manner.

Figure 22A:
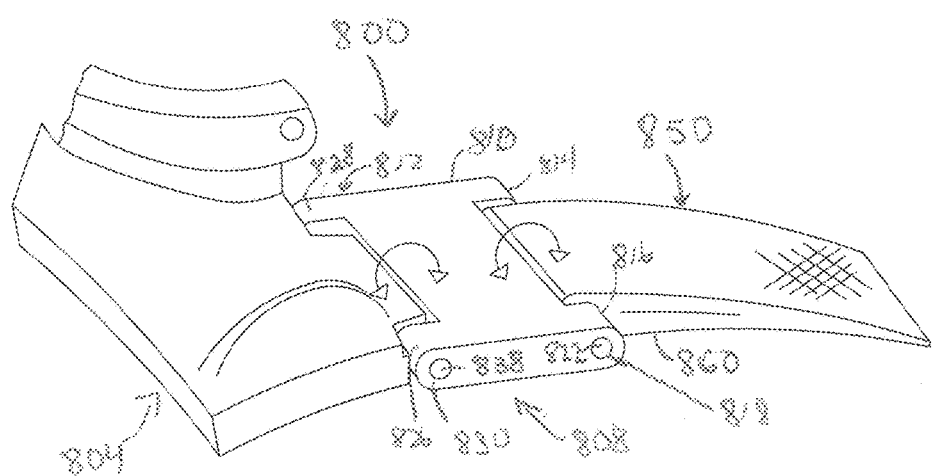
FIG. 22A is a perspective view of a connection mechanism according to another alternative exemplary embodiment.
Figure 22:
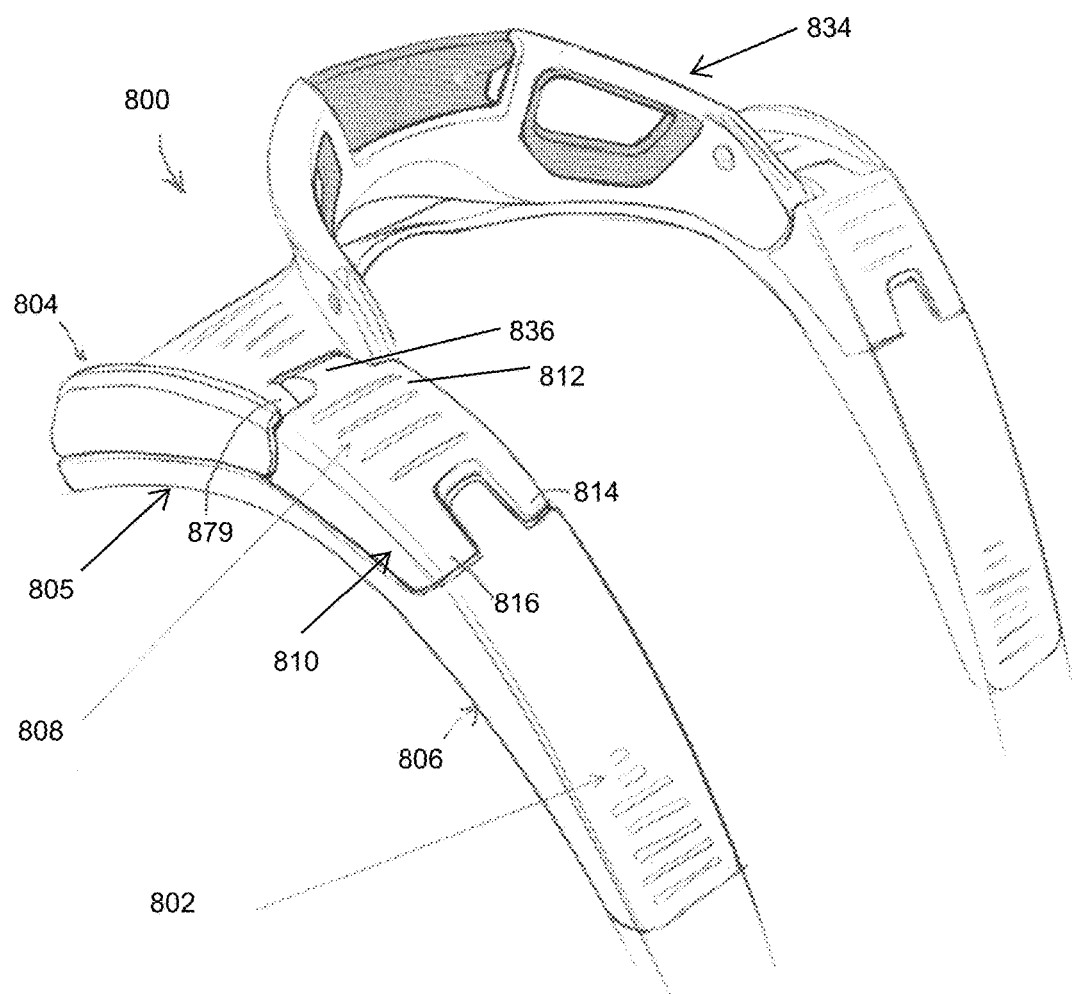
FIG. 22 is a right side perspective view of a leg and sidewing connection mechanism featuring a bridge member, according to another alternative exemplary embodiment.

In an alternative exemplary embodiment, shown in FIG. 22, a device 800 may have a leg 802 and sidewing 804. The leg proximal portion (i.e., proximal to the sidewing) comprises a bottom portion 805 of the leg 802 and extends at least partially under the sidewing 804. The device 800 has a connector construction whereby the leg 802 has a proximal portion 806 having a bore (not shown) extending therethrough. A bridge member 808 has a first end 810 and a second end 812. The bridge member 808 sits on top of the leg bottom portion 805. The first end 810 attaches to the leg 802 via a pair of knuckles 814, 816, each knuckle having a bore (only one bore 818 shown in FIG. 22A) extending at least partially therethrough, with a pin 822, 824 pivotally connecting the bridge member 808 and leg 802. A yoke 834 may have a sidewing 804 having a pair of knuckles 879 with at least one bore (not shown) extending at least partially therethrough. The bridge second end 812 is attached to the sidewing 804 by a knuckle 836 and a pin 838 (shown in FIG. 22A) extending through knuckles 836, 879. In an alternative exemplary embodiment, the second end 812 of the bridge 808 may have a pair of knuckles 826, 828 with bores as shown in FIG. 22A (only one bore 830 shown). In exemplary embodiments, the bridge 808 may optionally include one or more springs (not shown), such as, but not limited to, torsion springs, with one spring being associated with the pivot region between the leg 802 and the bridge 808, and, optionally, a second spring associated with the pivot region between the bridge 808 and the sidewing 804. The spring(s) can serve to dampen articulation, as described in greater detail hereinbelow.

FIG. 22A shows an exemplary embodiment that is a variation of the exemplary embodiment shown in FIG. 22. The device of FIG. 22A has a leg 850 having a proximal portion 860 that does not extend under a bridge 808 or a sidewing 804. Rather, the leg proximal portion 860 abuts the bridge knuckles 814, 816.

Alternatively, the leg proximal portion end may have a bore in each side of the leg and extending partially through the leg, and the knuckles may each have a post extending therefrom that can be inserted into the bores in the leg.

When the device is worn by a user, in various exemplary embodiments the yoke can articulate by pivoting about the pivot point up to the point where the knuckle face abuts the leg end face and the dampener.

In exemplary embodiments, various embodiments of the device can be constructed with the pivot point (between the leg and sidewing) moved forward or rearward (with respect to the front edge of the sidewing) for optimization of biomechanical performance.

Figure 23:
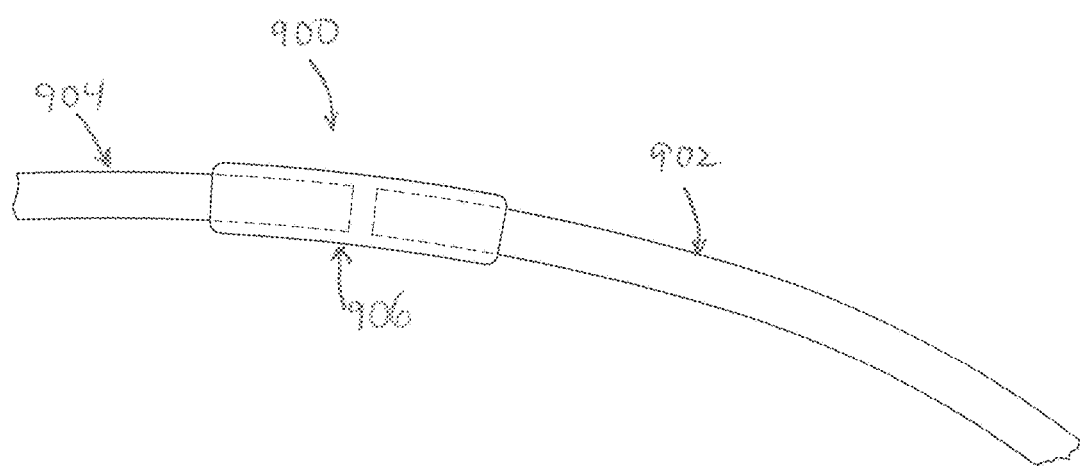
FIG. 23 is a right side elevational view of a leg and sidewing connection mechanism featuring a flexible connection member, according to another alternative exemplary embodiment.

In an alternative exemplary embodiment, shown in FIG. 23, a device 900 includes a leg 902 and sidewing 904 that are pivotably connected by a flexible connection member 906 that permits articulation about an axis or pivot point or area. In exemplary embodiments, the flexible connection member 906 may be made of a flexible rubber or plastic material.

Figure 24A:
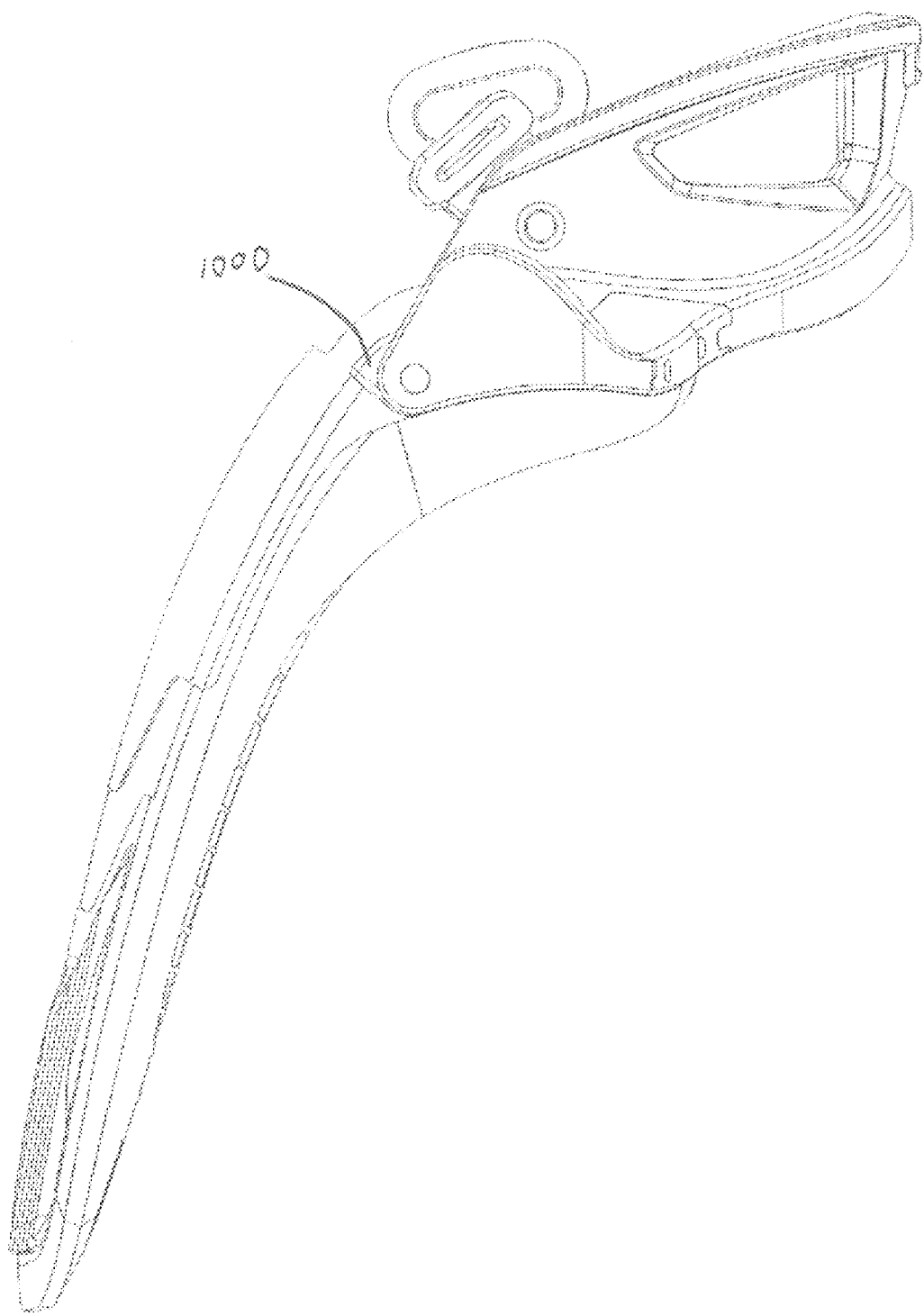
FIG. 24A is a left side schematic view of a portion of a leg and sidewing illustrating a dampener mechanism using a block of material according to one exemplary embodiment.
Figure 24B:
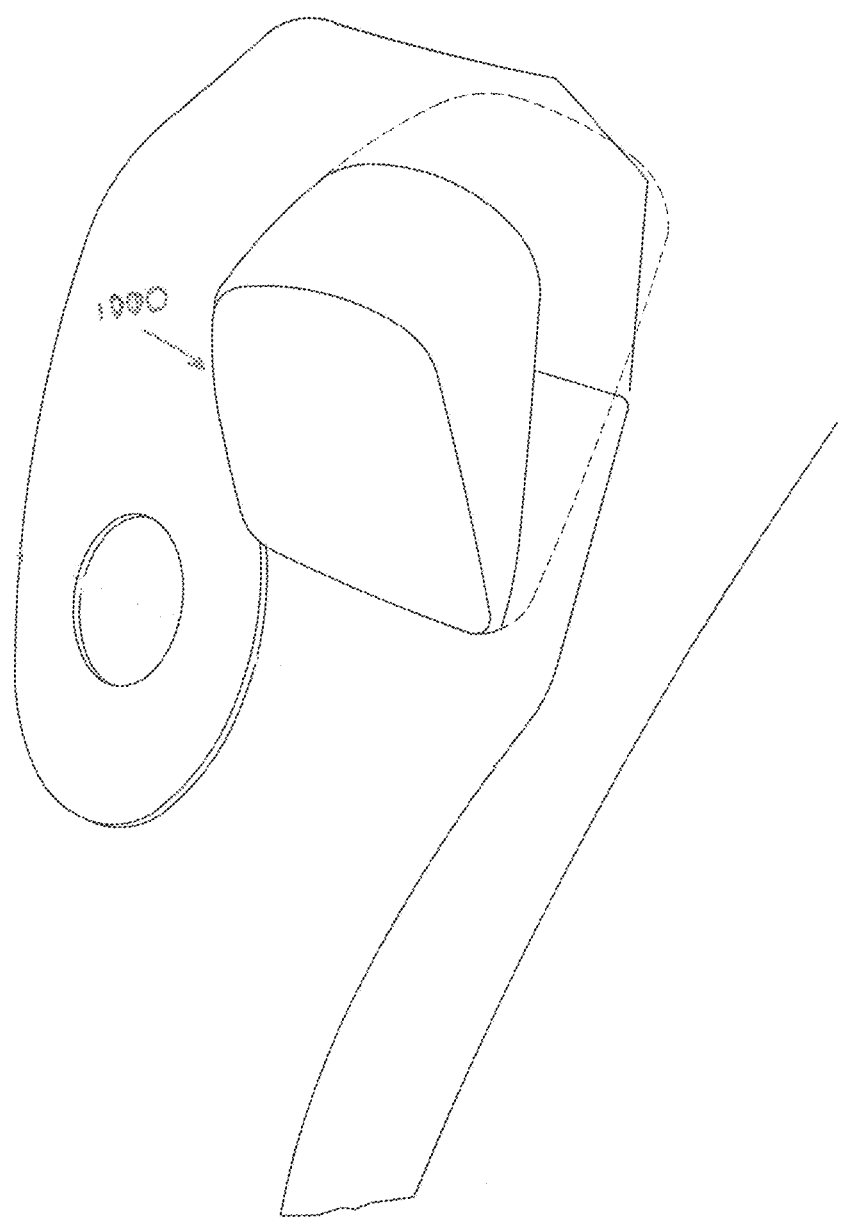
FIG. 24B is a schematic view showing the dampener of FIG. 24A in greater detail.
Figure 25A:
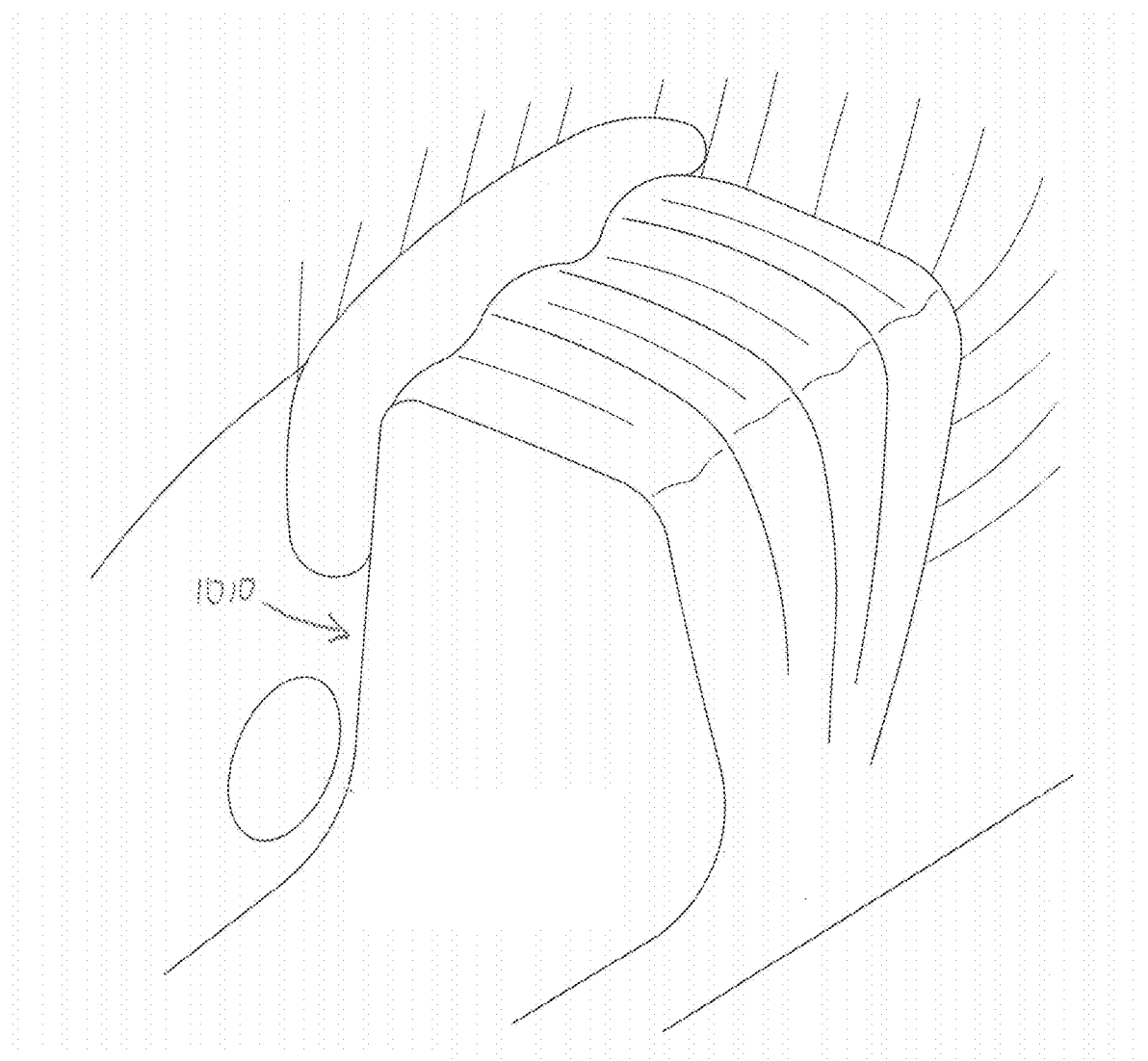
FIG. 25A is a perspective view of a device showing a dampener mechanism using a ribbed or accordion-type construction, according to a second exemplary embodiment in which the damper mechanism is associated with the yoke.
Figure 25B:
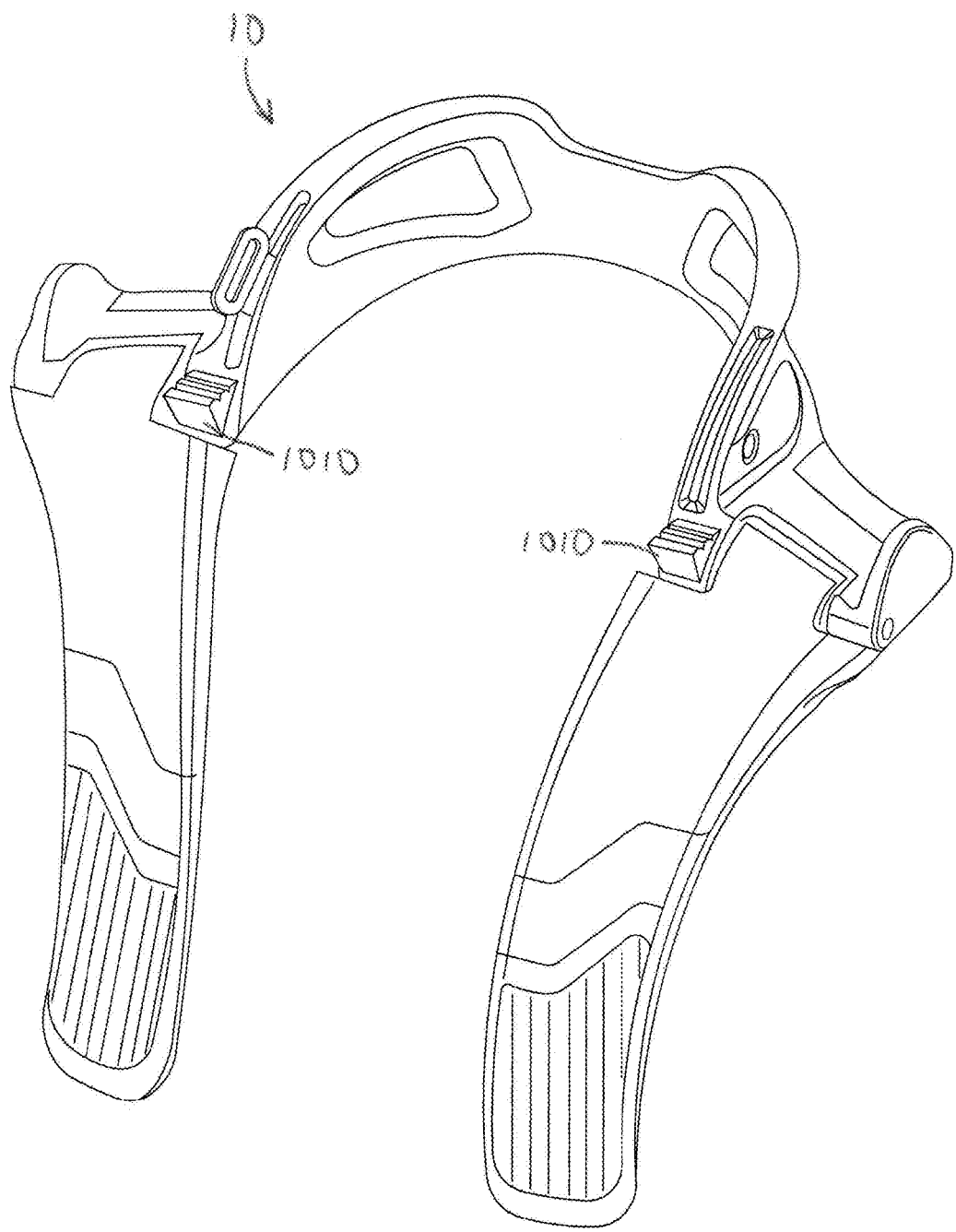
FIG. 25B is a detail view of a portion of the device and dampening mechanism of FIG. 25A
Figure 25C:
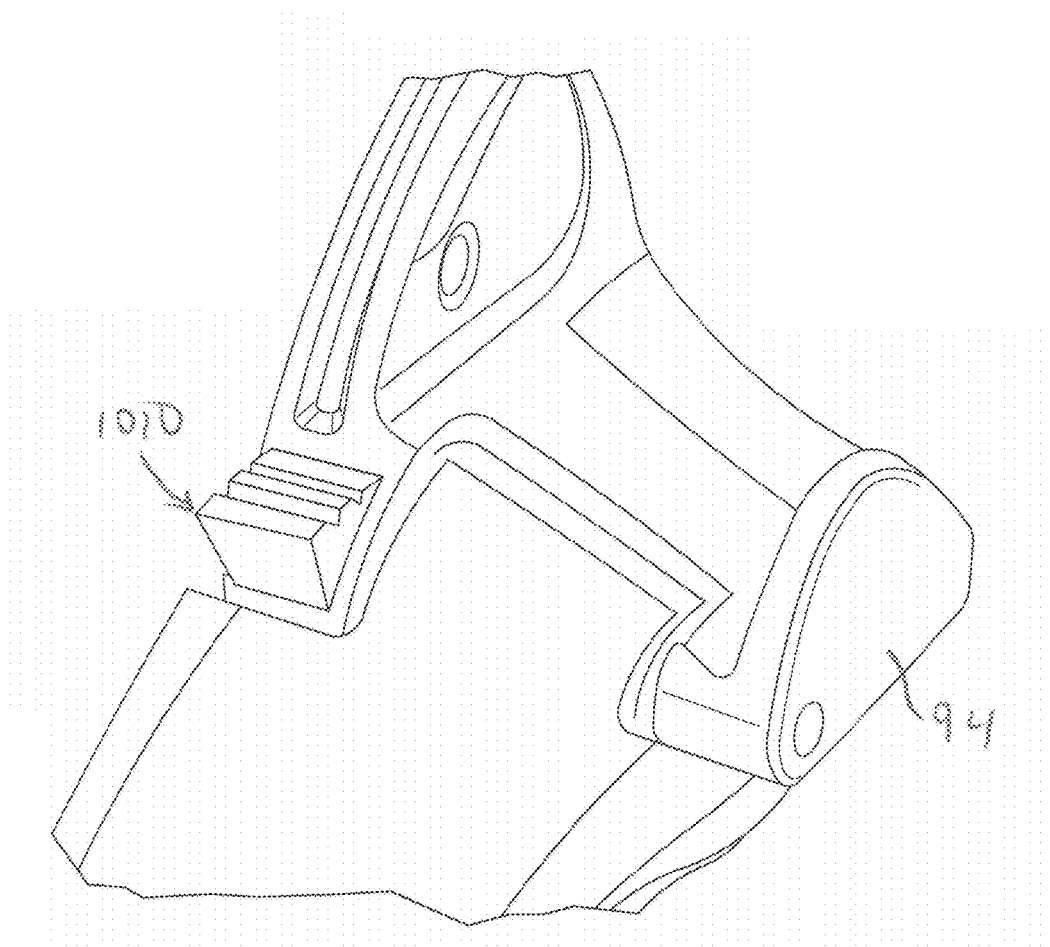
FIG. 25C is a detail view of the dampener mechanism of FIG. 25A.
Figure 25D:
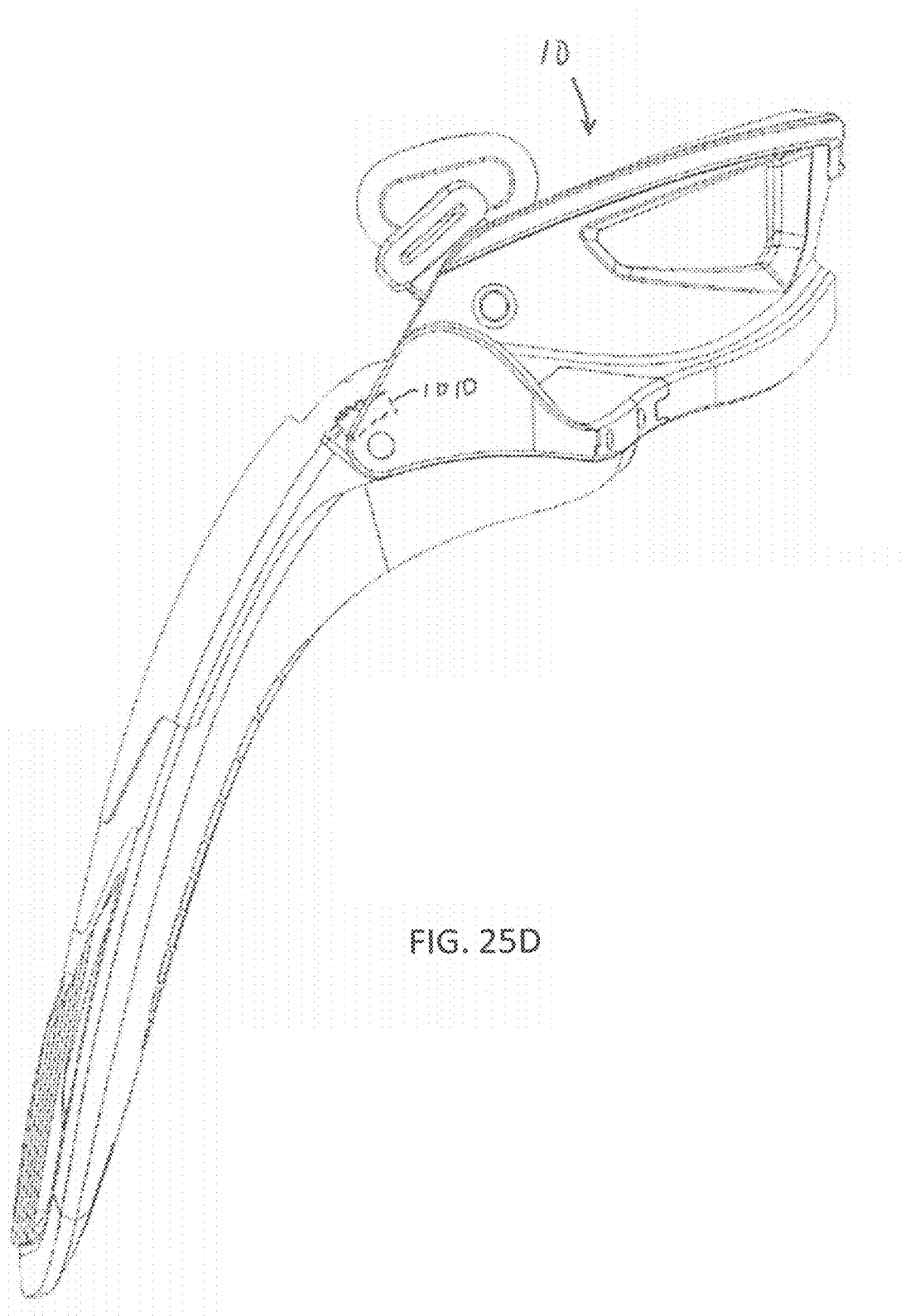
FIG. 25D is a left side elevational view of the damper mechanism of FIG. 25A.

In exemplary embodiments of devices described herein, a mechanism may be included for dampening, slowing and/or limiting articulating movement of the legs with respect to the yoke. In exemplary embodiments, a dampener mechanism is able to absorb energy of the pivoting movement of the device during an incident. In exemplary embodiments, such as the device shown in FIG. 2, the energy is the force movement of the yoke sidewing knuckle face as it approaches the leg end face. See the discussion hereinbelow and, for example, FIGS. 36-42, with respect to the operation and movement of exemplary embodiments of the device. One exemplary embodiment of a dampener mechanism, is a deformable or compressible block of material 1000 associated with the leg, as shown in FIGS. 24A and 24B. Alternatively, the dampener mechanism may be two pieces of material, one associated with the leg and the other associated with the sidewing. In exemplary embodiments, the dampener may be a solid block of material, such as rubber. In other exemplary embodiments, the dampener may be made of layers of different density or deformability material, or may be made of different materials. In another alternative exemplary embodiment, the dampener material may be made of a foam or a fabric material. In another alternative exemplary embodiment, the dampener may be a hollow member having a chamber or container filled with air, fluid, gel, particles, mixtures of the foregoing or the like, that can be deformed and/or compressed. In one exemplary embodiment, the dampener may be formed as a portion of the leg material, whereby the dampener portion has the desired deformability and/or compressibility characteristics.

Figure 26:
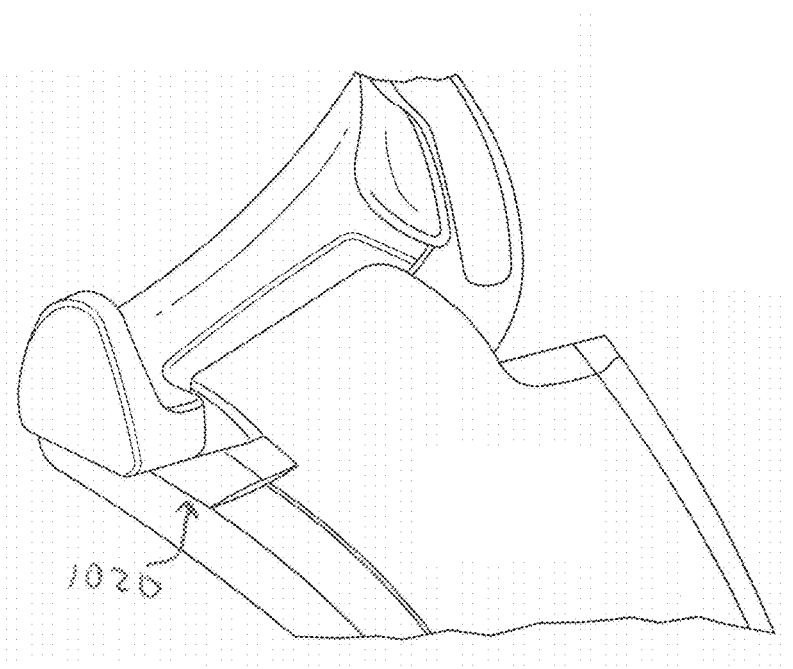
FIG. 26 is a detail perspective view of a dampener according to a third exemplary embodiment in which a block dampener has a portion that extends underneath part of the sidewing and part of the leg.
Figure 27:
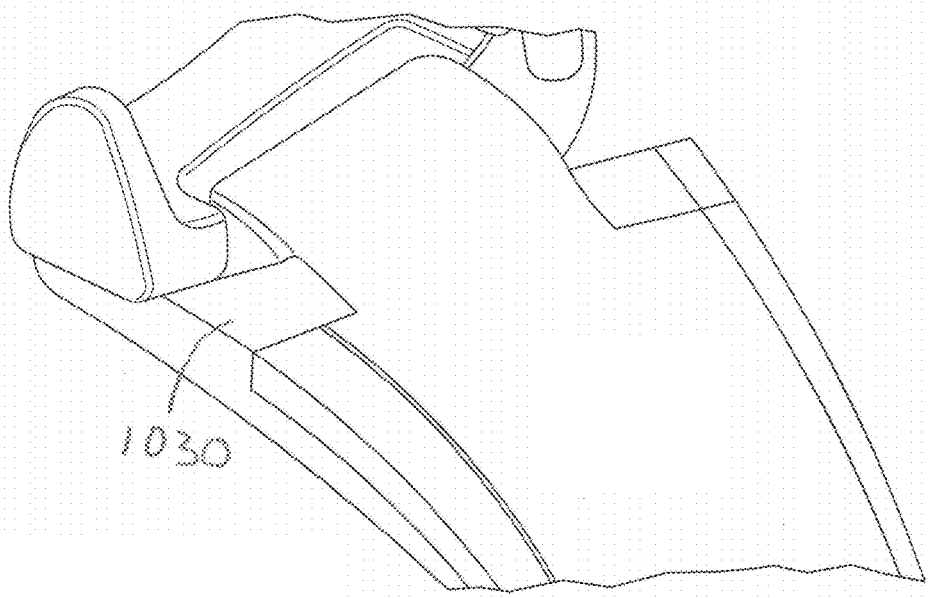
FIG. 27 is a perspective view of a dampener mechanism according to a fourth exemplary embodiment in which a ribbed dampener has a portion that extends underneath part of the sidewing and part of the leg.

In one exemplary embodiment, as shown in FIG. 25, a dampener 1010 may be made of ribs, segments or have accordion-like material or construction that is deformable and/or compressible. In exemplary embodiments, the dampener may be square, parallelepiped or wedge-shaped. In exemplary embodiments, as shown in FIGS. 25B-D, the dampener may be associated with the yoke or the sidewings. In exemplary embodiments, as shown in FIGS. 26-27, a dampener 1020 or 1030, respectively, may be formed as part of one layer of the bottom surface of the leg and which extends beyond the proximal portion end of the leg and extends at least partially underneath the sidewing, with the dampener 1020 or 1030 being a portion of such layer and extending upward into the gap between the sidewing knuckle face and the leg end face.

Figure 28:
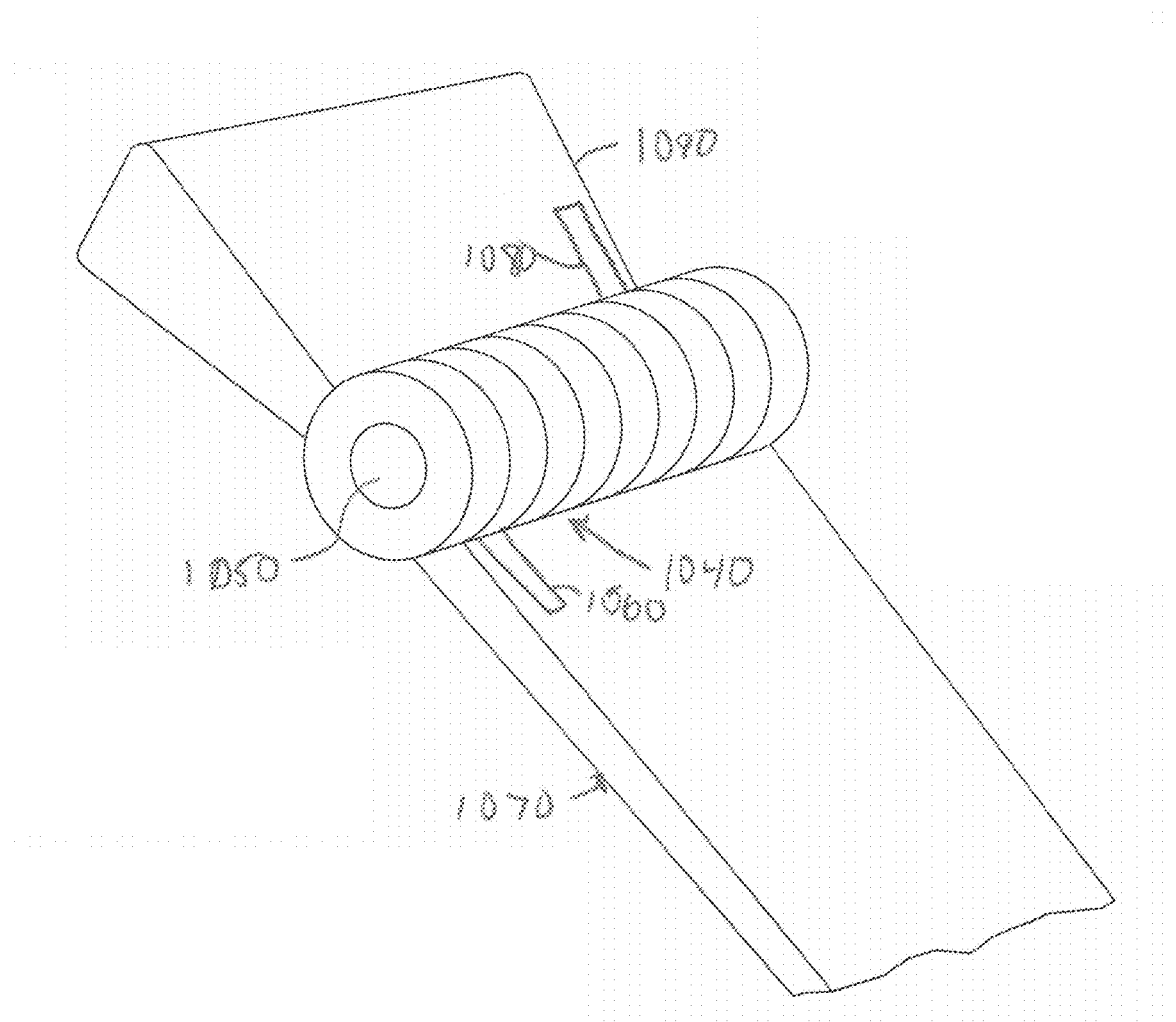
FIG. 28 is a perspective view of a dampener mechanism featuring a torsion spring, according to a fifth exemplary embodiment.

In another alternative exemplary embodiment, shown in FIG. 28, the dampener may be a torsion spring 1040, as shown in FIG. 28, whereby the torsion spring 1040 is wrapped around a pin 1050 and one end 1060 of the spring 1040 abuts a leg 1070 and the other end 1080 of the spring abuts a sidewing 1090 such that the torsion spring 1040 is biased to urge the collar (not shown) in the nonarticulated position.

Figure 29:
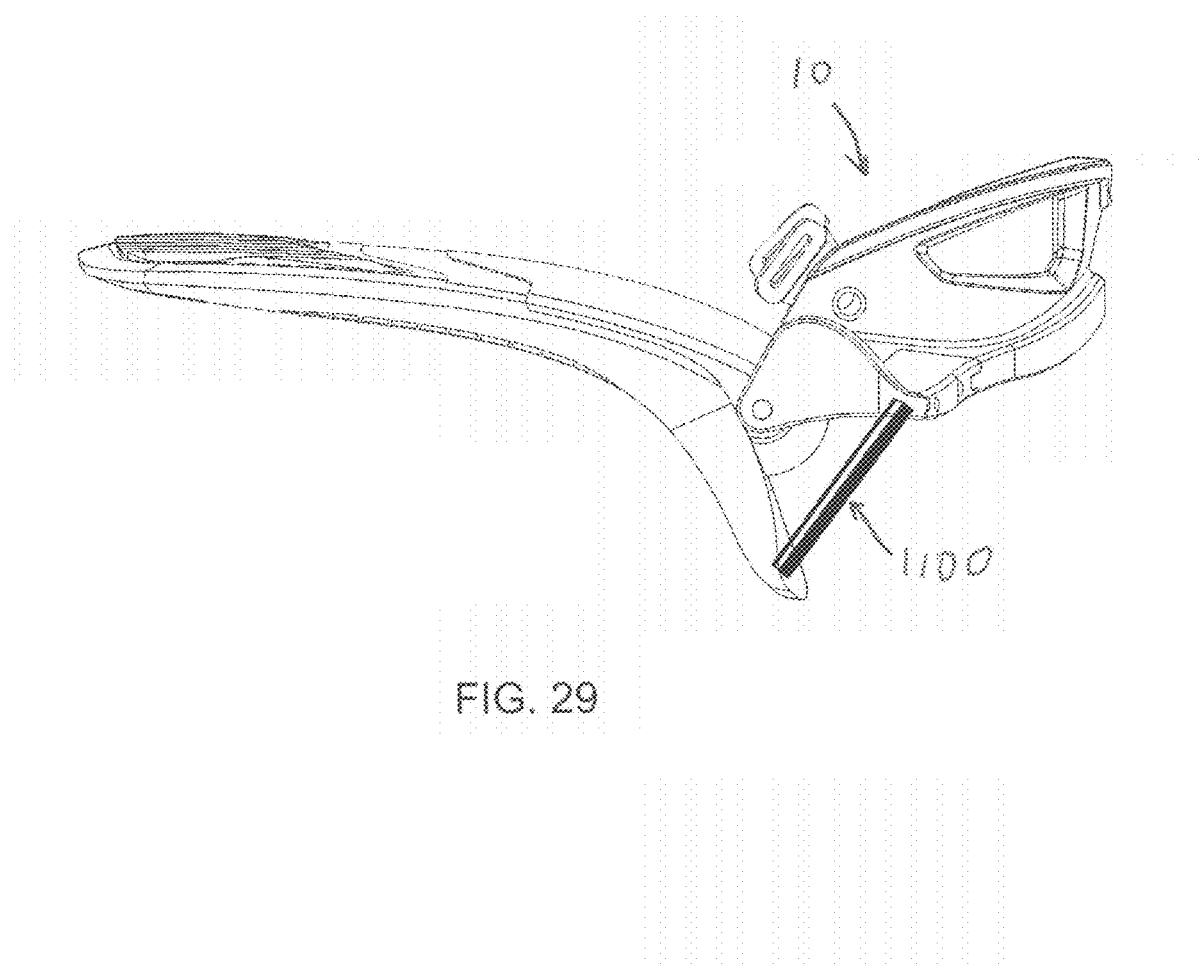
FIG. 29 is a perspective view of a dampener mechanism featuring an elastic band, according to a sixth exemplary embodiment.

In another alternative exemplary embodiment, as shown in FIG. 29 dampener may comprise an elastic band or piece of elastic material 1100 attached at one end to the sidewing and at the other end to the leg.

Figure 30:
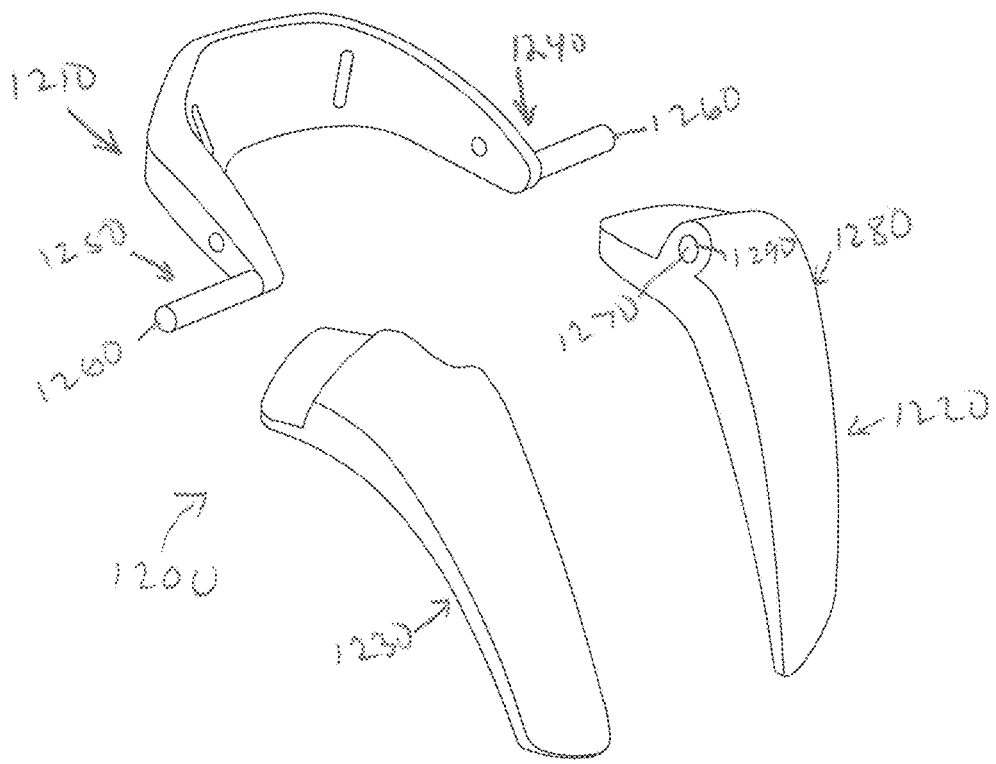
FIG. 30 is an exploded perspective view of a device having legs detachable from a collar, according to one exemplary embodiment.
Figure 31:
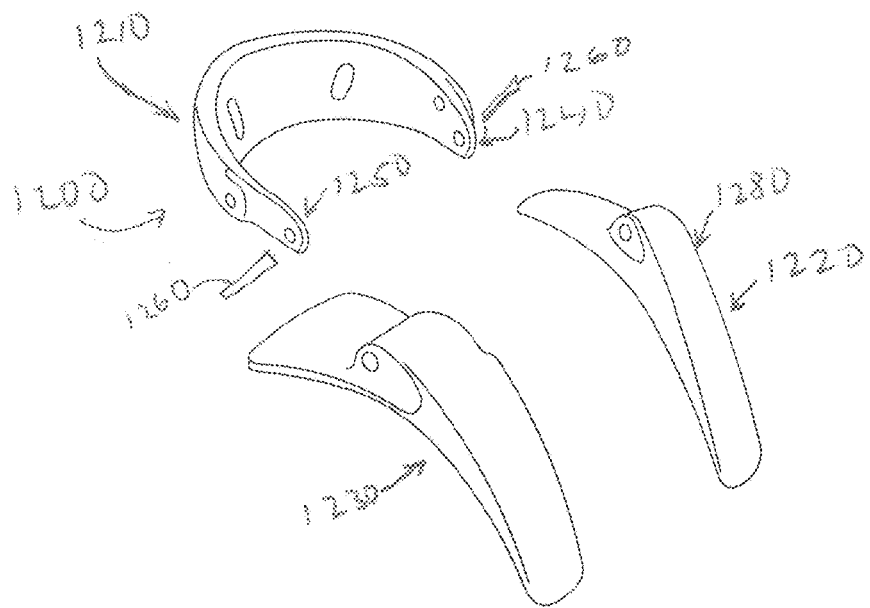
FIG. 31 is an exploded perspective view of the device of FIG. 30 showing the pins detached.
Figure 32:
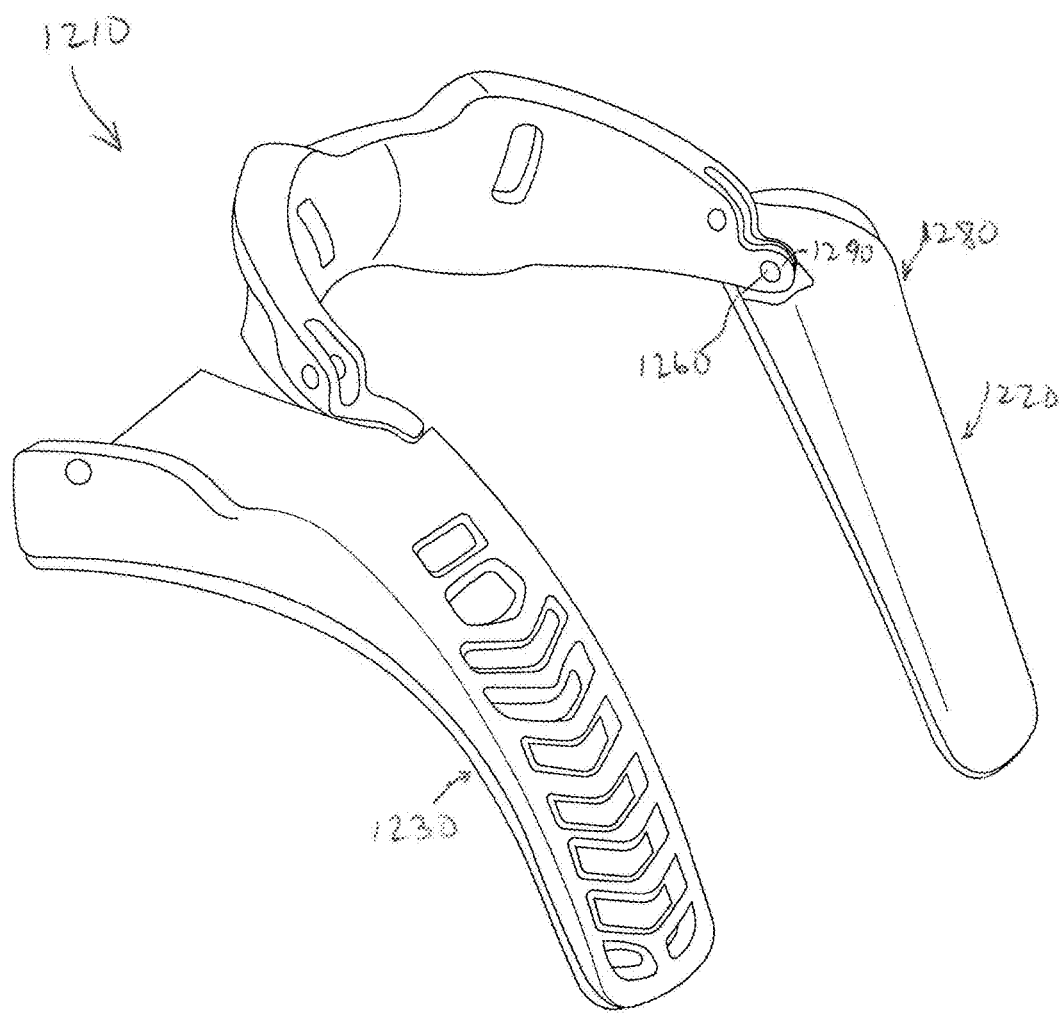
FIG. 32 is a perspective view of the device of FIG. 30.
Figure 33:
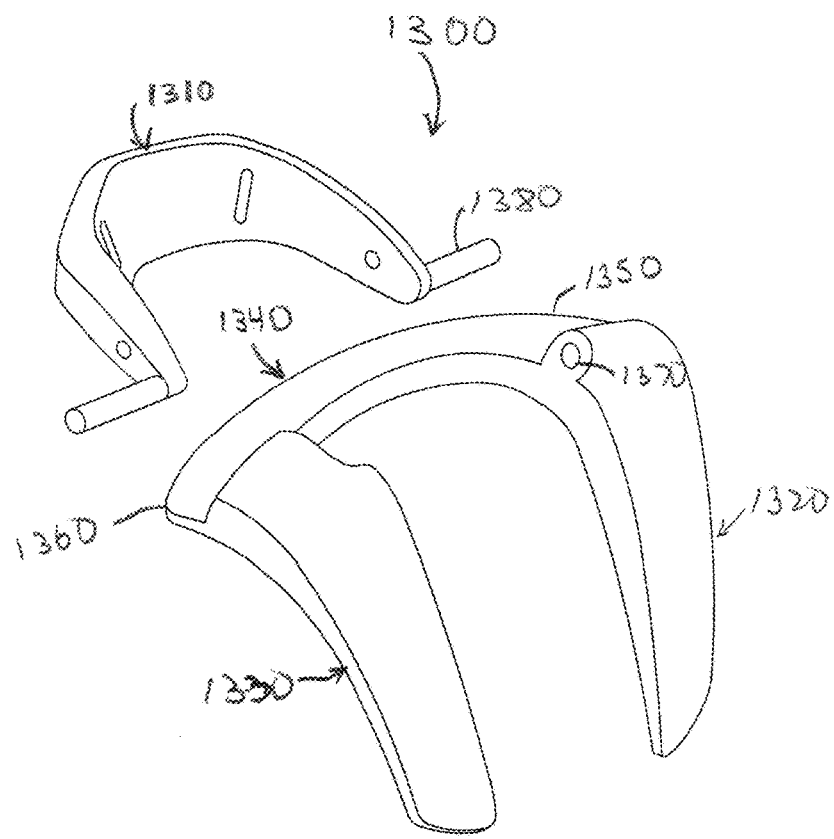
FIG. 33 is an exploded perspective view of a device having integrated yoke and legs that are detachable from a collar, according to one exemplary embodiment.
Figure 34:
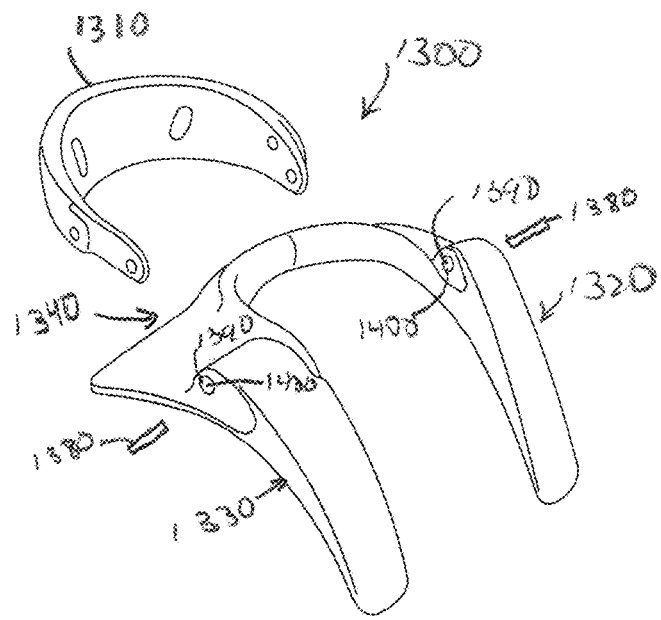
FIG. 34 is an exploded perspective view of the device of FIG. 33 showing the pins detached.
Figure 35:
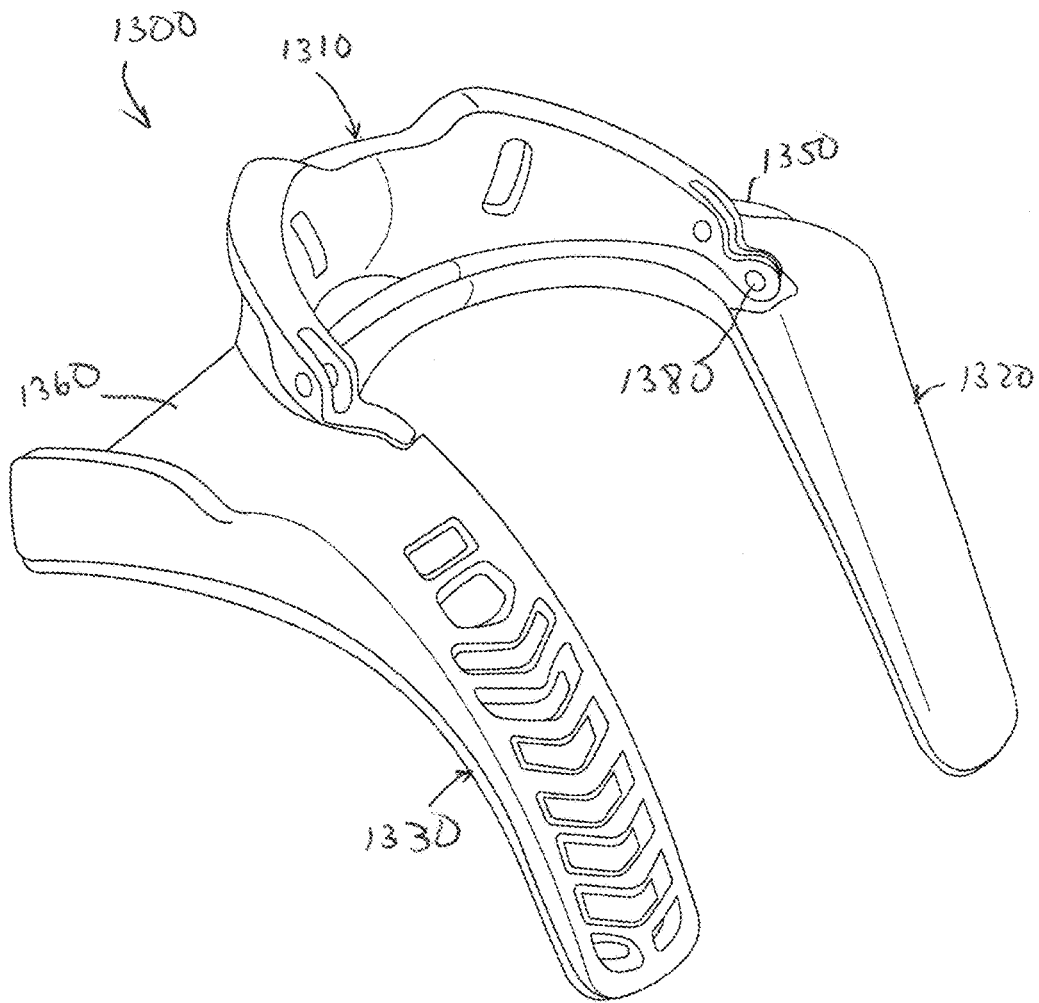
FIG. 35 is a perspective view of the device of FIG. 33.

In the alternative exemplary embodiments illustrated in FIGS. 30-35, the sidewings are either eliminated or are incorporated in the legs. FIGS. 30-32 illustrate an exemplary embodiment in which the leg and sidewing are formed as one material and there is no articulating movement between the two. In FIGS. 33-35, the legs and yolk are formed as a single piece, which also has no articulation movement between the legs and yoke. The articulation in the exemplary embodiments shown in FIGS. 30-35 is provided by the hinged collar.

In a first exemplary embodiment of a device without sidewings or where the sidewings are incorporated in the legs, as shown in FIGS. 30-32, a device 1200 has a collar 1210 and legs 1220, 1230. The collar 1210 has first and second side attachment sections 1240, 1250, each of which are each pivotably attachable to the first leg 1220 or second leg 1230, respectively. Each side attachment section 1240, 1250 may have a pin 1260 associated with and extending laterally therefrom. The pin 1260 may be formed as part of the side attachment section 1240, 1250 or attached thereto. Each leg 1220, 1230 may have a boss 1270 associated with a proximal end 1280 of the leg 1220, 1230. The boss 1270 has a bore 1290 extending at least partially therethrough, in which the pin 1260 can be inserted. The collar 1210 can pivot about the pin 1260 to provide the articulated movement with respect to the legs 1220, 1230.

In another exemplary embodiment, shown in FIG. 33-35, a device 1300 is provided having a yoke 1340 that includes a pair of legs 1320, 1330. The legs 1320, 1330 are fixed in position with respect to the yoke 1340. A collar 1310 is pivotably attached to the yoke 1340. The yoke 1340 has a first end 1350 and second end 1360, each end having a bore 1370 passing at least partially therethrough. A pin 1380 is inserted through a bore 1390 in a boss 1400 in the first leg 1320 and another pin 1380 is inserted through a bore 1390 in a boss 1400 in the second leg 1330. The collar 1310 can pivot about the pins 1390 to provide articulated movement in the event of an incidents.

In the exemplary embodiments illustrated in FIGS. 30-35, the safety belt 4 does not form part of the system that limits the rate and amount of collar articulation. For example, the rate of articulation could be managed by a spring (such as, but not limited to, a torsion spring) or the amount by limited stops in the hinge/pivot mechanism, such as by detents in the pin that interact with one or more protrusions in the bore in which the pin pivots. Alternatively, the pin may have one or more protrusions that interact with detents or recesses in the bore so as to create "stops".

In the alternative exemplary embodiments described hereinabove illustrated in FIGS. 30-35, a dampener mechanism as described hereinabove may be incorporated proximate to the pivot areas and, in exemplary embodiments, at least partially between the collar first and second ends and the leg bosses.

Figure 40:
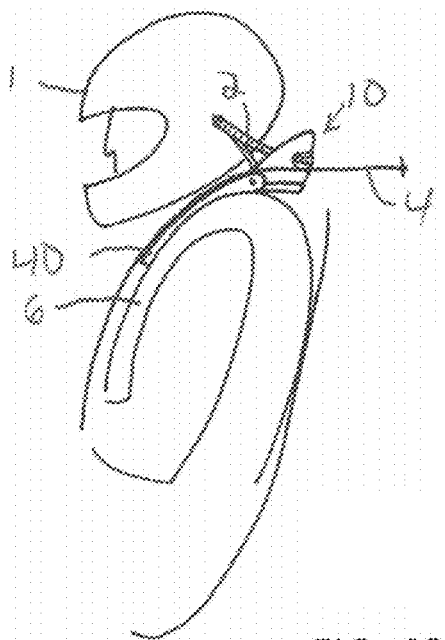
FIG. 40 is a left side schematic view of a user fitted with a helmet, safety belt and a device according to one exemplary embodiment, in which the user's head, neck and upper torso are in a "resting" position, i.e., not being subject to a traumatic incident.
Figure 41:
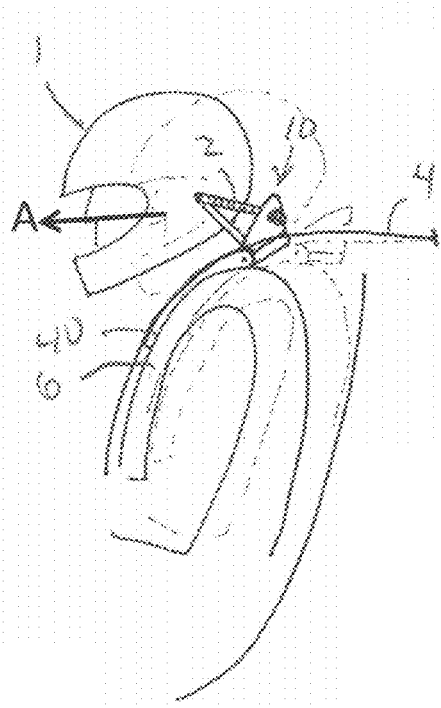
FIG. 41 is a left side schematic view of a user wearing the device as shown in FIG. 40, but having been subjected to a car crash incident.

The basic operational movement of the device will now be described. In exemplary embodiments, as shown in FIGS. 40 and 41, a device 10 (or the other exemplary embodiments of devices) fits within free space between the user's helmet 1, neck 5 and upper torso 6. The legs 40, 50 ensure optimal fit and comfort.

FIG. 40 shows how in normal vehicle operations the helmet tethers 2 may be slack and the collar 60 and sidewings 54, 56 at least partially free of the safety belt system 4. The device 10 is in a nonarticulated position (sometimes referred to as a first position or configuration), for example as shown in FIG. 2. This permits the user an unconstrained range of head/helmet motions even if, to provide for the optimal biomechanical performance of the restraint device, the tethering systems may be relatively short.

Figure 36:
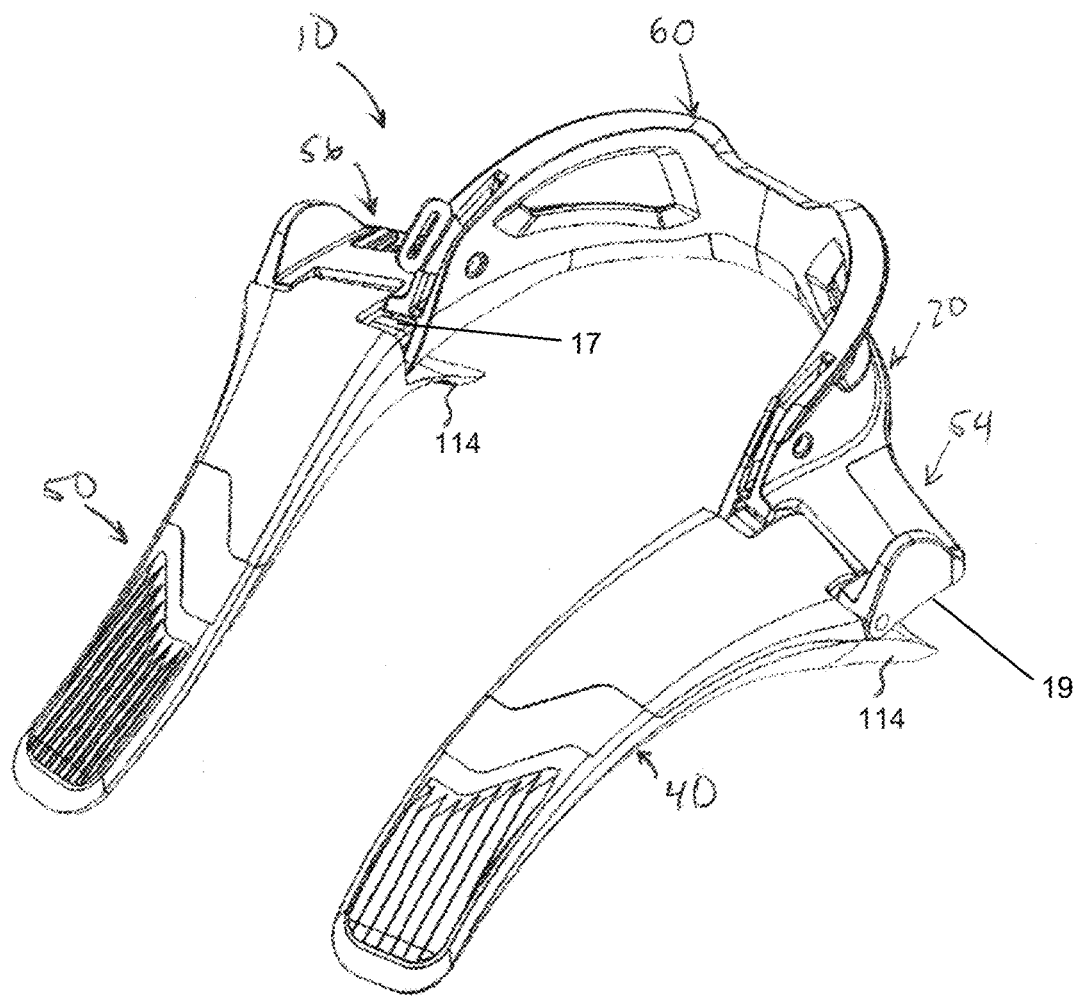
FIG. 36 is a perspective view of the device of FIG. 2 with the collar in a partially articulated position.
Figure 37:
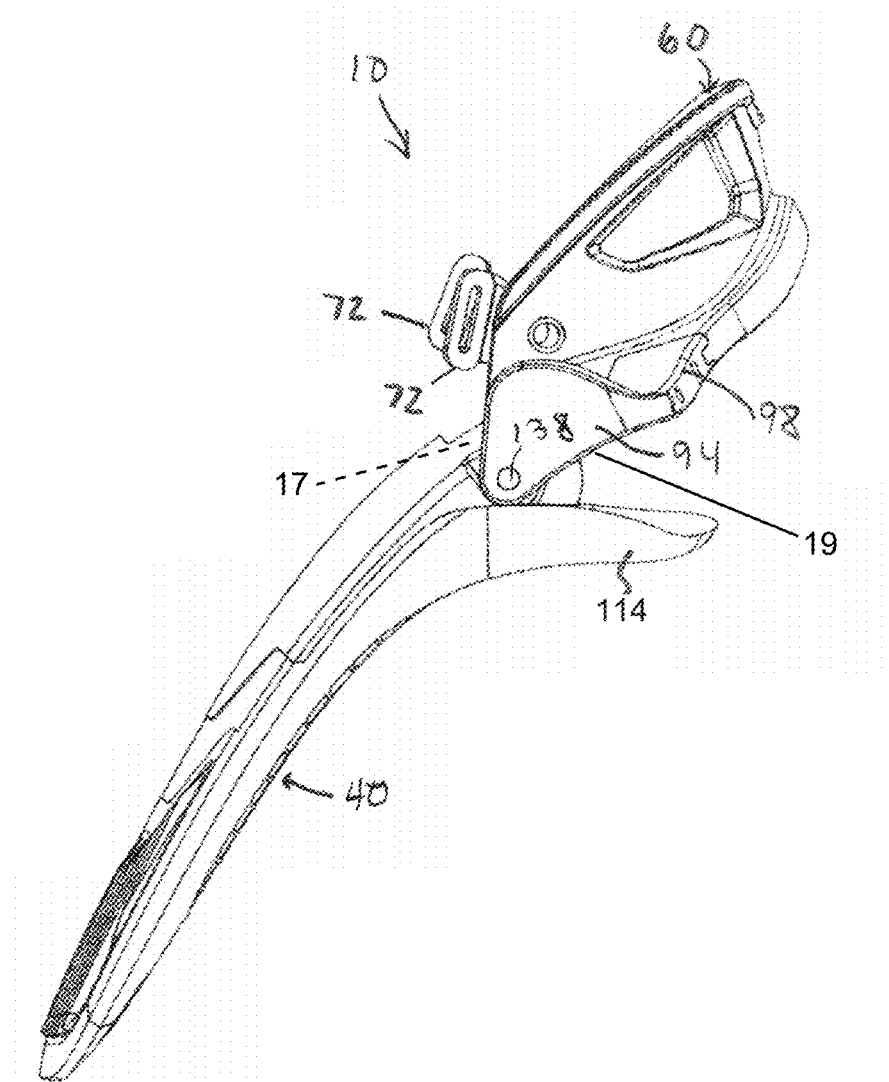
FIG. 37 is a left side view of the device of FIG. 36.
Figure 38:
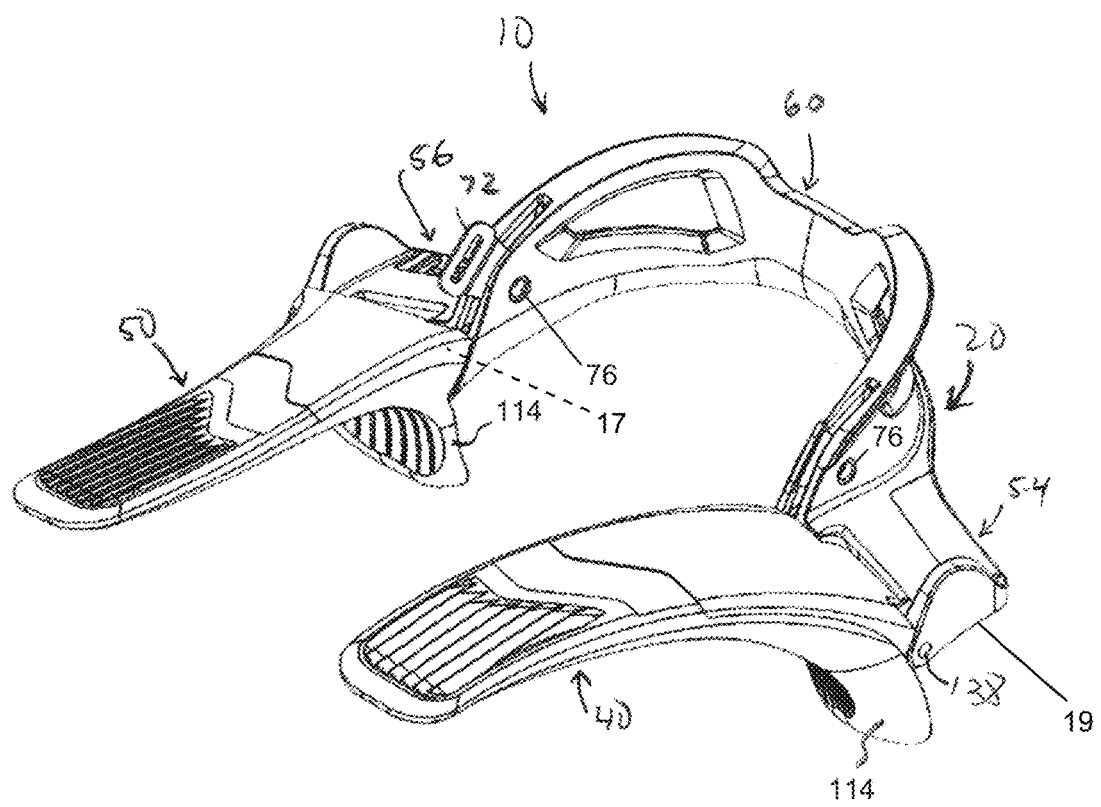
FIG. 38 is a perspective view of the device of FIG. 2 with the collar in a substantially fully articulated position.

As shown in FIG. 41, in a car crash incident with a frontal force component the user tends to move forward as the safety belt system 4 yields in tension and the user's torso 6 compresses under increased load until such time as compliance in both is taken up. As this head/helmet excursion occurs, any slack in the tethering system is taken up and the collar 60/sidewings 54, 56 pivots (as shown in FIG. 36-37 in mid-articulation, ending up fully articulated as shown in FIGS. 38-39 (sometimes referred to as a second position/configuration)), a portion of the safety belt 4 is positioned within the belt guides 90 of the sidewings 54, 56 and the base surface 92 acts with the safety belt 4 to decelerate the user's head such that differential loads and moments between the user's head and torso transmitted through the upper neck are managed to within desirable magnitudes. Management of these loads and moments is further enhanced by limiting the absolute relative motion of the collar 60, to which the sidewings 54, 56 are attached, and the legs 40, 50, which are clamped to the user's torso 6 by loads imparted through the safety belt system 4, and optionally also by incorporating a dampening block 1000 (or other dampening mechanism described hereinabove, as shown in FIGS. 24-29) regulating the rate at which the absolute relative motion is stopped. In embodiments described herein where the sidewings are not part of the articulating collar mechanism, decelerating the user's head such that differential loads and moments between the user's head and torso transmitted through the upper neck are managed to within desirable magnitudes may be wholly managed by various exemplary embodiments of the dampening mechanisms described hereinabove. These features may combine to allow a compact design using shorter length tethering systems which inherently accommodate a wide range of user body types and seating configurations in one simple device yet providing the desired or improved biomechanical performance characteristics.

Figure 42:
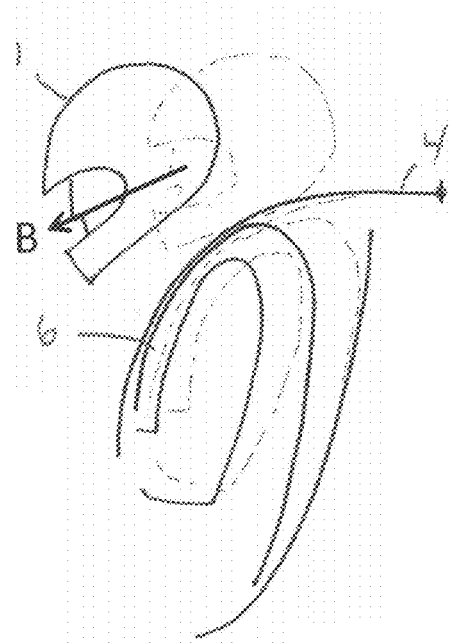
FIG. 42 is a left side schematic view of a user not wearing a device of the present disclosure, and having been subjected to a car crash incident, showing the movement forward and angling down of the head and neck.

Without a restraint system in a car crash incident with a frontal force component the user, as shown in FIG. 42, tends to move forward as the safety belt system tensions and the user's torso compresses under increased load until such time as compliance in both is taken up. As this occurs, as the user's head/helmet is not restrained, it may continue to accelerate, rotate and/or translate. The resulting differential loads and moments between the user's head and torso transmitted through the upper neck may rise to undesirable, and even lethal, magnitudes. In an incident with a user using a device as presently disclosed, the head movement is shown by arrow A in FIG. 41. The head movement of a user not wearing a device as presently disclosed may have head movement shown by arrow B in FIG. 42. The angle of arrow A is nearly parallel to the ground, whereas the angle of arrow B is at a more declined angle, indicating more head and neck movement forward and angling downward, which can cause trauma to the spine and neck. Additionally, FIGS. 41 and 42 illustrate the relative amount of forward movement of the head; there is less forward movement of the user's head in FIG. 41, wearing a device, than of the user's head in FIG. 42, not wearing a device.

As the yoke 20 pivots during an incident (shown partially rotated in FIGS. 36-37 and substantially fully rotated in FIG. 38-39) the sidewing knuckle faces approach the corresponding leg end face. A dampener block (such as dampener 1000 as shown in FIGS. 24A-B) associated, for example, with the leg end 136 face (such as, for example, by being attached or adhered to the leg end face or within a recess in the leg end face), is contacted by the approaching sidewing knuckle faces 133 and, upon further articulation of the yoke 20, is compressed. The compression force resistance dampens or decelerates the rotational movement of the yoke 20 until such movement stops. The dampener effectively reduces the abruptness of the termination of the yoke's movement, thereby absorbing some of the force and reducing trauma to the user's head, neck, spine and other areas. In exemplary embodiments, the legs 40, 50 are each pivotable relative to the yoke 20 between at least a first position/configuration (e.g., the nonarticulated position shown for example in FIGS. 2 and 3) and a second position/configuration (e.g., the fully articulated position shown for example in FIGS. 38 and 39). In the first position/configuration, the flaps 114 of each leg 40, 50 are engaged with the bottom surfaces 19 of the respective sidewings 54, 56 to limit pivoting movement of the legs 40, 50, and engaging portions 17 of the legs 40, 50 are spaced apart from the respective sidewings 54, 56. In the second position/configuration, the flaps 114 of each leg 40, 50 are spaced apart from the bottom surfaces 19 of the respective sidewings 54, 56, and engaging portions 17 of the legs 40, 50 are engaged with the respective sidewings 54, 56 to limit pivoting movement of the legs 40, 50.

Figure 3:
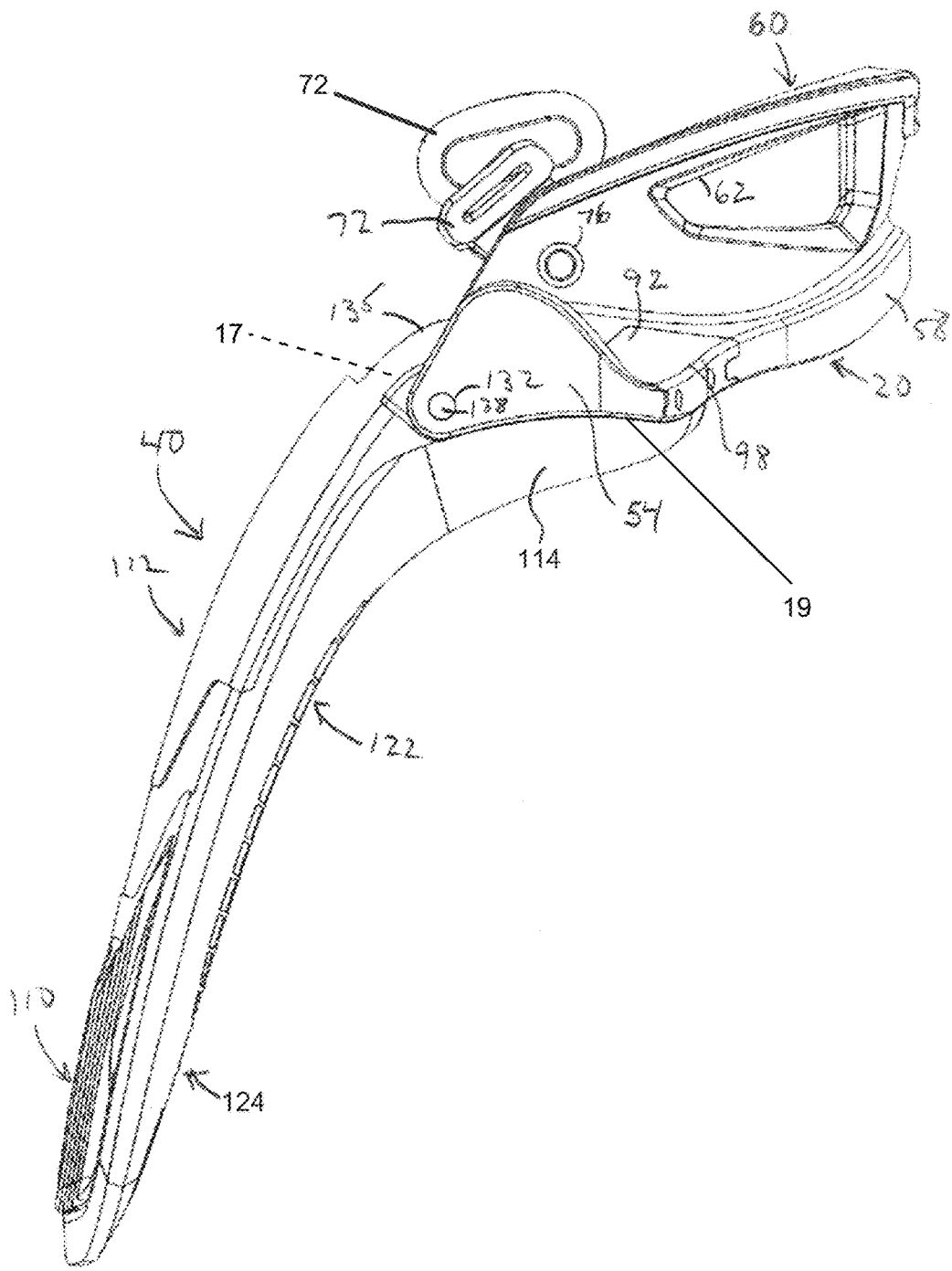
FIG. 3 is a left side elevational view of the device of FIG. 2.
Figure 4:
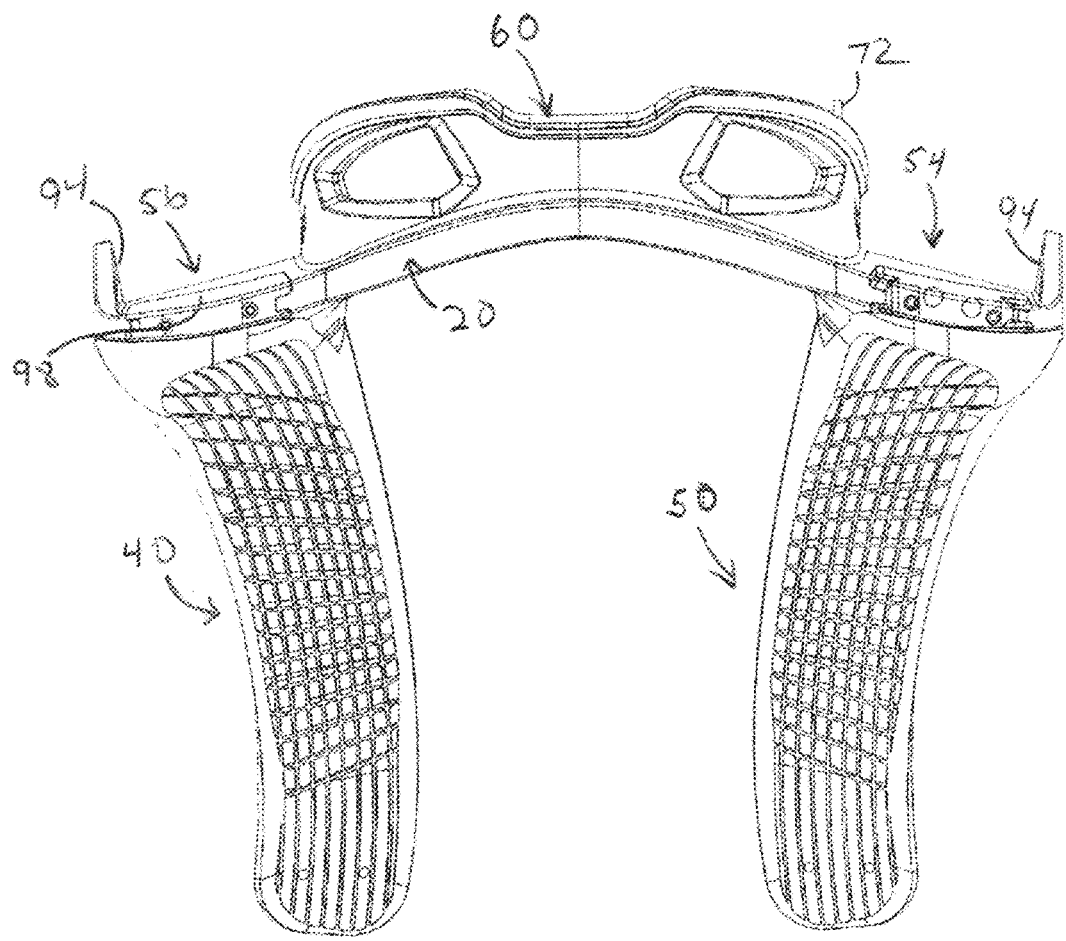
FIG. 4 is a rear elevational view of the device of FIG. 2.

In exemplary embodiments in which at least a portion of the sidewings 54, 56 base surface 92 is curved (from front to back, e.g., as a cammed surface), such as the embodiment illustrated in FIGS. 2-3, when the yoke 20 pivots during an incident, a portion of the safety belt 4 is positioned within the sidewings guide 90 and the cammed base surface 92 acts to decelerate the user's head such that differential loads and moments between the user's head and upper neck are managed to within desirable magnitudes. A cammed base surface 92 may also permit use of a shorter tether 2, yet providing the same biomechanical performance characteristics. By controlling the rate at which the user experiences the differential loads and moments that are applied to the user's head and upper neck it may also provide greater energy management during an incident.

A feature of the device is that in various exemplary embodiments, the device can be fitted for different height or body types. Another feature is that the device can accommodate a user who is angled or reclined at different angles, depending on the seat design, user's preferences, or the like. Another feature of various exemplary embodiments of the device is that the flexible legs provide improved comfort to a user. Another feature of various exemplary embodiments of the device is that the dampener mechanism can reduce traumatic cessation of movement by providing graduated or gradual completion of the articulation movement of the collar with respect to the legs. A feature of various exemplary embodiments of the device (such as, but not limited to, FIGS. 30-32) is that the legs may be selectively detachable. The legs may be of different sizes, lengths, colors, widths, materials or other configurations or designs can be used with the same yoke and/or collar.

Although only a number of exemplary embodiments have been described in detail above, those skilled in the art will readily appreciate that many modifications are possible in the exemplary embodiments without materially departing from the novel teachings and advantages. Accordingly, all such modifications are intended to be included within the scope of this disclosure as defined in the following claims.

While the methods, equipment and systems have been described in connection with specific embodiments, it is not intended that the scope be limited to the particular embodiments set forth, as the embodiments herein are intended in all respects to be illustrative rather than restrictive.

As used in the specification and the appended claims, the singular forms "a," "an" and "the" include plural referents unless the context clearly dictates otherwise.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods, equipment and systems. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all methods, equipment and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

It should further be noted that any patents, applications and publications referred to herein are incorporated by reference in their entirety.

What is claimed is:

1. A head and neck restraint device, comprising:
   a) a yoke having
      i) a base portion,
      ii) a stand-up collar portion coupled to the base portion,
      iii) a first sidewing coupled to a first side of the base portion, the first sidewing including a top surface and a bottom surface opposite the top surface, the top surface configured to receive a portion of a safety belt of a vehicle thereon,
      iv) a second sidewing coupled to a second side of the base portion opposite the first side, the second sidewing including a top surface and a bottom surface opposite the top surface, the top surface configured to receive a portion of the safety belt thereon, and,
      v) a tether coupled to the collar portion and adapted to connect with a helmet;
   b) a first leg having
      i) a proximal portion,
      ii) a distal portion spaced apart from the proximal portion,
      iii) a front surface configured to receive a portion of the safety belt thereon,
      iv) a rear surface opposite the front surface, and v) a first connector member extending outward from the front surface adjacent the proximal portion of the first leg, the first connector member configured to couple the first leg with the first sidewing for pivoting articulation with respect to the yoke, and c) a second leg having
i) a proximal portion,
ii) a distal portion spaced apart from the proximal portion,
iii) a front surface configured to receive a portion of the safety belt thereon,
iv) a rear surface opposite the front surface,
v) a second connector member extending outward from the front surface adjacent the proximal portion of the second leg, the second connector member configured to couple the second leg with the second sidewing for pivoting articulation with respect to the yoke, and wherein the first and second legs are each pivotable relative to the yoke between at least a first position and a second position, wherein engaging portions of the front surfaces of the first and second legs are spaced apart from the respective first and second sidewings and the first and second legs are engaged with the bottom surfaces of the respective first and second sidewings to limit pivoting movement of the first and second legs when the first and second legs are in the first position, wherein the first and second legs are spaced apart from the bottom surfaces of the respective first and second sidewings and the engaging portions of the front surfaces of the first and second legs are engaged with the respective first and second sidewings to limit pivoting movement of the first and second legs when the first and second legs are in the second position, and wherein each of the first and second legs is pivotable relative to the yoke independent of the other of the first and second legs.

2. The head and neck restraint device of claim 1, wherein at least a portion of each of the first and second leg distal portions are adapted to flex.

3. The head and neck restraint device of claim 1, wherein each of the first and second sidewings further comprises a dampening mechanism adapted to regulate the rate at which the yoke reaches absolute zero motion relative to the first and second legs when the first and second legs reach the second position.

4. The head and neck restraint device of claim 3, wherein the dampening mechanism comprises a block of an elastomeric compressible material.

5. The head and neck restraint device of claim 1, wherein the first and second leg distal portions are each constructed of a single material.

6. The head and neck restraint device of claim 1, wherein the distal portions of each of the first and second legs comprises at least two zones, each zone having a degree of flexion.

7. The head and neck restraint device of claim 1, further comprising a tether anchor coupled to the collar portion for maintaining the tether in association with the collar portion.

8. The head and neck restraint device of claim 1, wherein each of the first and second sidewings further comprises a pair of spaced apart knuckles having a recessed area defined therebetween, and wherein the connector members of the first and second legs are received in the recessed area of the respective first and second sidewings.

9. The head and neck restraint device of claim 8, further comprising a first pin extending through the knuckles of the first sidewing and the connector member of the first leg to couple the first leg with the first sidewing, and a second pin extending through the knuckles of the second sidewing and the connector member of the second leg to couple the second leg with the second sidewing.

10. The head and neck restraint device of claim 1, wherein the first and second sidewings each further include a guide for a portion of the safety belt.

11. The head and neck restraint device of claim 10, wherein the guide comprises at least one wall portion extending generally perpendicularly from the respective first or second sidewing.

12. The head and neck restraint device of claim 10, wherein the guide comprises a channel formed in at least a portion of the respective first or second sidewing.

13. A head and neck restraint device, comprising: a) a yoke having i) a base portion, ii) a stand-up collar portion coupled to the base portion, iii) a first sidewing coupled to one side of the base portion, and, iv) a second sidewing coupled to an opposing side of the base portion from the first sidewing; and, b) first and second legs, each leg having i) a proximal portion, ii) a distal portion spaced apart from the proximal portion, iii) a front surface, iv) a rear surface opposite the front surface, v) a connector member mounted for rotation relative to one of the first and second sidewings such that each leg is capable of limited pivoting articulation relative to the respective first or second sidewing, wherein the first and second legs and first and second sidewings are configured to absorb forces as the yoke moves from a first configuration to a second configuration relative to the first and second legs, and the first and second legs are independently pivotable relative to the yoke, wherein the first and second legs are each pivotable relative to the yoke between at least a first position and a second position, wherein each of the first and second legs further includes a flap extending from the proximal portion along a bottom surface of the respective first or second sidewing, wherein engaging portions of the front surfaces of the first and second legs are spaced apart from the respective first and second sidewings and the flaps of the first and second legs are engaged with the bottom surfaces of the respective first and second sidewings to limit pivoting movement of the first and second legs when the first and second legs are in the first position, and wherein the flaps of the first and second legs are spaced apart from the bottom surfaces of the respective first and second sidewings and the engaging portions of the front surfaces of the first and second legs are engaged with the respective first and second sidewings to limit pivoting movement of the first and second legs when the first and second legs are in the second position.

14. The head and neck restraint device of claim 3, wherein each of the first and second legs further includes a flap extending from the proximal portion along the bottom surface of the respective first or second sidewing.

15. The head and neck restraint device of claim 14, wherein the engaging portions of the front surfaces of the first and second legs are spaced apart from the dampening mechanisms and the flaps of the first and second legs are engaged with the bottom surfaces of the respective first and second sidewings to limit pivoting movement of the first and second legs when the first and second legs are in the first position, and wherein the flaps are spaced apart from the bottom surfaces of the respective first and second sidewings and the engaging portions of the front surfaces of the first and second legs are engaged with the respective dampening mechanisms of the respective first and second sidewings to limit pivoting movement of the first and second legs when the first and second legs are in the second position.

16. The head and neck restraint device of claim 13, wherein each of the first and second sidewings includes a pair of spaced apart knuckles having a recessed area defined therebetween, and wherein the connector members of the first and second legs are received in the recessed area of the respective first and second sidewings.

17. The head and neck restraint device of claim 16, further comprising a first pin extending through the knuckles of the first sidewing and the connector member of the first leg to couple the first leg with the first sidewing, and a second pin extending through the knuckles of the second sidewing and the connector member of the second leg to couple the second leg with the second sidewing.

18. The head and neck restraint device of claim 17, further comprising a tether coupled to the collar portion and adapted to connect with a helmet.

\* \* \* \* \*